(12) United States Patent
Kaneko

(10) Patent No.: US 6,666,559 B2
(45) Date of Patent: Dec. 23, 2003

(54) VARIABLE-PROFILE OPTICAL DEVICE INCLUDING VARIABLE-PROFILE MIRROR AND OPTICAL ELEMENT INCLUDING VARIABLE-PROFILE OPTICAL ELEMENT

(75) Inventor: Shinji Kaneko, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/122,655

(22) Filed: Apr. 15, 2002

(65) Prior Publication Data

US 2002/0149864 A1 Oct. 17, 2002

(30) Foreign Application Priority Data

Apr. 17, 2001 (JP) .......................... 2001-118640
Apr. 27, 2001 (JP) .......................... 2001-133435

(51) Int. Cl.$^7$ ............................................... G02B 5/08
(52) U.S. Cl. .................... 359/846; 359/847; 359/848
(58) Field of Search ................................. 359/846, 847, 359/848, 878, 224, 225

(56) References Cited

FOREIGN PATENT DOCUMENTS

| JP | 3-27090 B2 | 6/1985 |
| JP | 1-219801 A | 9/1989 |
| JP | 2-101402 A | 4/1990 |
| JP | 3-81132 B2 | 12/1991 |

OTHER PUBLICATIONS

A. Olsson et al; "A Numerical Design Study of the Valveless Diffuser Pump Using a Lumped–Mass Model"; J. Micromech. Microeng. 9 (1999); pp. 34–44.
S. M. Sze; VLSI Technology; Second Edition, pp. 414–417; ISBN.

Primary Examiner—Mohammad Sikder
(74) Attorney, Agent, or Firm—Frishauf, Holtz, Hoodman & Chick, P.C.

(57) ABSTRACT

A variable-profile optical device includes a light-transmission elastic member in which an elasticity of a first surface is set to be higher than that of a second surface disposed opposite to the first surface, wherein a pressure is applied to the second surface of the elastic member, so that the second surface of the elastic member is selectively deformed, and a focus distance may be varied.

9 Claims, 21 Drawing Sheets

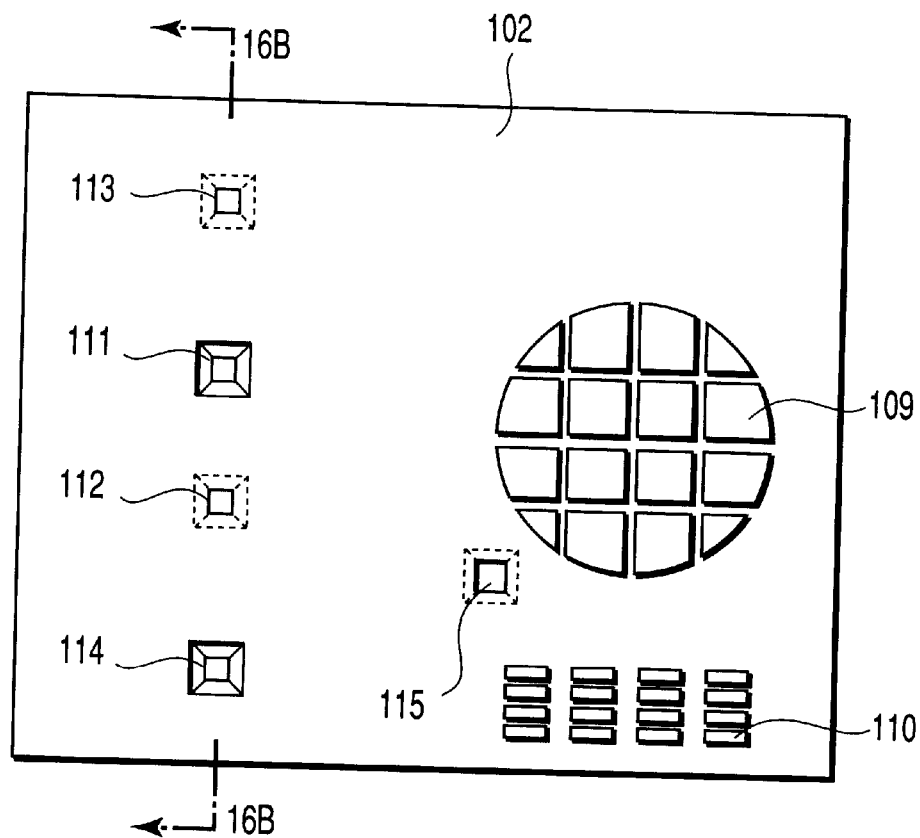
F I G. 16A
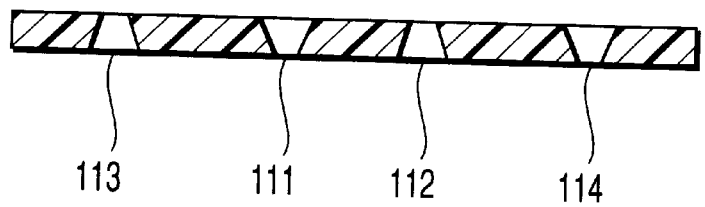
F I G. 16B

VARIABLE-PROFILE OPTICAL DEVICE INCLUDING VARIABLE-PROFILE MIRROR AND OPTICAL ELEMENT INCLUDING VARIABLE-PROFILE OPTICAL ELEMENT

CROSS-REFERENCE TO RELATED APPLICATIONS

This application is based upon and claims the benefit of priority from the prior Japanese Patent Applications No. 2001-118640, filed Apr. 17, 2001; and No. 2001-133435, filed Apr. 27, 2001, the entire contents of both of which are incorporated herein by reference.

BACKGROUND OF THE INVENTION

1. Field of the Invention

The present invention relates to a variable-profile optical device and optical element in which a curvature can continuously be changed, particularly to a small-sized variable-profile optical device and optical element to which a semiconductor technique is applied.

Moreover, the present invention relates to a variable-profile mirror and variable-profile optical element, particularly to a small-sized variable-profile mirror and variable-profile optical element to which a semiconductor technique is applied in a variable-profile optical device having a curvature able to be continuously varied.

2. Description of the Related Art

In micro optics such as an optical pickup, for the purpose of simplifying a mechanism related with focusing in which an electromagnetic actuator is used, there has heretofore been proposed a micro variable focus mirror in which the curvature of a reflective surface can be changed.

Moreover, also in small-sized optics for camera, application of the variable focus mirror can largely contribute to miniaturization.

In a variable focus mirror, when a so-called micro electromechanical system (MEMS) technique with a semiconductor manufacturing technique applied thereto is used, low-cost high-precision production can be expected.

Known driving methods for this type of variable-profile mirror include using an electrostatic attractive force, as described in Jpn. Pat. Appln. KOKAI Publication No. 2-101402, a piezoelectric effect, as described in Jpn. Pat. Appln. KOKOKU Publication No. 3-81132, fluid pressure, as described in Jpn. Pat. Appln. KOKAI Publication No. 1-219801, and the like.

These methods have advantages and disadvantages, but the method of using fluid pressure is suitable for use in which a relatively large displacement to a convex surface from a concave surface is required.

As an example of a variable-profile mirror driven by fluid pressure, the method described in Jpn. Pat. Appln. KOKAI Publication No. 1-219801 will briefly be described with reference to FIG. 26.

A variable focus mirror 1 is constituted of a shell 2, chamber pressure adjustment apparatus 3, and reflective mirror 4.

A pressure chamber 5 is formed in the shell 2, and a holder 7 for holding the reflective mirror 4 in an airtight manner by O rings 6 is formed in an opening of the shell.

The pressure chamber 5 is connected to a pressure gauge 8 and piping 9 of the chamber pressure adjustment apparatus 3.

The piping 9 is branched into a compressor piping 9a and vacuum pump piping 9b, and the piping can appropriately be switched to a compressor 11a or a vacuum pump 11b by electromagnetic operation valves 10a, 10b.

In the constitution, the switching is performed, when a controller 12 opens/closes the electromagnetic operation valves 10a, 10b.

The reflective mirror 4 is formed of a thin plate, and a reflective surface 13 is coated with a reflective material such as aluminum.

In the variable focus mirror 1 constituted as described above, to obtain a concave reflective surface 13a, the electromagnetic operation valve 10a is closed, and the electromagnetic operation valve 10b is opened by the controller 12.

In this case, when the pressure chamber 5 is connected to the vacuum pump piping 9b, a negative pressure is produced by the vacuum pump 11b.

Therefore, in this case, the reflective mirror 4 is deflected toward the pressure chamber 5, and the concave reflective surface 13a is formed.

On the other hand, to form a convex reflective surface 13b of the reflective mirror 4, the electromagnetic operation valve 10a is opened, and the electromagnetic operation valve 10b is closed by the controller 12.

In this case, when the pressure chamber 5 is connected to the compressor piping 9a, a positive pressure is produced by the compressor 11a.

Therefore, in this case, the reflective mirror 4 is deflected away from the pressure chamber, and the convex reflective surface 13b is formed.

Furthermore, when the pressure of the pressure chamber 5 is controlled to be the same as an external pressure, the reflective surface 13 has a flat reflective surface 13c due to the elasticity thereof.

For the shape of the reflective surface 13, when the controller 12 is controlled based on a measured value of the pressure gauge 8, the reflective mirror 4 can continuously be set at an optional focal distance.

As compared with the electrostatic attractive force driving method in which the displacement amount is limited by the distance between electrodes, or the piezoelectric driving method in which it is difficult to obtain a large deflection because of limitation of the materials of the reflective surface, the variable-profile mirror whose driving source is fluid pressure is preferable particularly for use in which a broad range of focal distances are required.

The variable focus mirror of the above-described fluid pressure system has a problem that a pump or compressor is necessary and therefore it is very difficult to miniaturize the mirror.

Moreover, the above-described variable focus mirror of the fluid pressure system has complicated mechanisms such as a valve, and has a problem that efficiency or response is deteriorated due to the pump and pressure chamber channel.

Furthermore, since a uniform force is exerted on a deformable portion of the variable focus mirror in principle in the method of using fluid pressure, the deformed shape has rotational symmetry. However, since light is generally incident from an oblique direction in relation to a light path in the reflective optics, a large aberration is generated.

In this respect, the transmission type variable-profile optical device (i.e., a variable-profile lens) is advantageous. For example, in the conventional variable focus lens described in Jpn. Pat. Appln. KOKOKU Publication No. 3-27090 (corresponding to Jpn. Pat. KOKAI Publication No. 60-114802), as the deformable member needs to be sealed in a container, there is a problem that assembly is complicated, and the lens is not suitable for miniaturization.

Moreover, for the above-described variable focus mirror of the fluid pressure system, because the mechanism is complicated, it is difficult to miniaturize the mirror, and there is a problem that the efficiency and response are deteriorated.

Furthermore, the above-described variable focus mirror of the fluid pressure system is applied particularly to the optics in which the light is obliquely incident. In this case, the aberration is generated in principle, and this may cause serious problems, depending on the use.

BRIEF SUMMARY OF THE INVENTION

An object of the present invention is to provide a low-cost variable-profile optical device and optical element which have a quick response, and which can obtain a sufficient displacement with a small size.

Another object of the present invention is to provide a transmission-type variable-profile optical device and optical element which are small-sized and highly efficient.

A further object of the present invention is to provide a low-cost variable-profile mirror and variable-profile optical element which has a quick response, and which can obtain a sufficient displacement with a small size.

Another object of the present invention is to provide large-displacement variable-profile optical device in which fluid pressure is used, and a composite variable-profile optical element in which aberration correction is also achieved.

To achieve the above-described objects, according to a first aspect of the present invention, there is provided a variable-profile optical device comprising:

a light-transmission elastic member in which an elasticity of a first surface is set to be higher than that of a second surface disposed opposite the first surface, wherein a pressure is applied to the second surface of the elastic member, so that the second surface of the elastic member is selectively deformed, and a focus distance may be varied.

To achieve the objects, according to a second aspect of the present invention, there is provided a variable-profile optical device comprising:

a light-transmission elastic member; and a transparent rigid member bonded to a first surface of the elastic member, wherein a pressure is applied to a second surface disposed opposite the first surface of the elastic member, so that the second surface of the elastic member is selectively deformed, and a focus distance may be varied.

To achieve the objects, according to a third aspect of the present invention, there is provided an optical element comprising:

a variable-profile optical device in which a pressure is applied to an elastic portion, a profile of the elastic portion is thereby changed and a focus distance may be varied;

a structural member which is bonded to a portion of the variable-profile optical device, and which supports the variable-profile optical device;

a pressure chamber bonded to the elastic portion of the variable-profile optical device, so that the pressure is applied to the elastic portion of the variable-profile optical device;

a pump device including a chamber, a diaphragm which also serves as a portion of a wall of the chamber, and nozzles for suction and discharge which are connected to the chamber; and a vibration device which vibrates the diaphragm of the pump device, wherein the pump device is connected to the pressure chamber and the outside of the structural member, at least a portion of the pressure chamber and a portion of the chamber of the pump device are disposed in the same structural member, and a vibration frequency or amplitude of the vibration device is controlled, so that a focus distance of the variable-profile optical device may be varied.

To achieve the objects, according to a fourth aspect of the present invention, the optical element according to the third aspect further comprises: a mark for optical axis adjustment in a visible portion of the structural member.

To achieve the objects, according to a fifth aspect of the present invention, there is provided the optical element according to the third or fourth aspect wherein the variable-profile optical device has light transmission properties, the first surface has rigidity, and the second surface disposed opposite the first surface has an elasticity lower than that of the first surface, and the second surface constitutes a variable-profile lens as the elastic portion to which the pressure is to be applied.

To achieve the objects, according to a sixth aspect of the present invention, there is provided the optical element according to the third or fourth aspect wherein the variable-profile optical device comprises a flexible thin film having at least a reflective surface in the first surface, and a second surface of the flexible thin film constitutes a variable-profile mirror as the elastic portion to which the pressure is to be applied.

To achieve the objects, according to a seventh aspect of the present invention, there is provided the optical element according to the third or fourth aspect, further comprising: a plurality of the pump device; and a plurality of the vibration device, wherein at least one of the pump device is connected in such a manner that the pressure chamber is pressurized, and at least one of the other pump device is connected in such a manner that the pressure of the pressure chamber is reduced, and respective chambers of the plurality of the pump device are arranged via a line crossing at right angles to an optical axis of the variable-profile optical device.

To achieve the objects, according to an eighth aspect of the present invention, there is provided the optical element according to the seventh aspect, which stops the vibration device of the pump device for pressurizing or the vibration device of the pump device for pressure reduction, and controls the pressure of the pressure chamber to a desired value.

To achieve the objects, according to a ninth aspect of the present invention, there is provided a variable-profile mirror comprising:

a flexible thin film having an optical reflective surface;

a frame member which supports the flexible thin film;

a substrate which is disposed opposite to the flexible thin film, and which is bonded to the frame member;

a pressure chamber which includes a space surrounded by the flexible thin film and the substrate, and in which the flexible thin film and the substrate form a portion of a wall;

a pump device which is disposed opposite to the pressure chamber via the substrate, and which is bonded to the substrate;

a first channel which extends through the substrate, and which connects the pressure chamber to the pump device; and a second channel which connects the pump device to the outside, wherein the pump device sucks or discharges fluid with respect to the pressure chamber through the first and second channels, and the profile of the flexible thin film may be varied.

Moreover, to achieve the objects, according to a tenth aspect of the present invention, there is provided the variable-profile mirror according to the ninth aspect, wherein sectional areas of the first and second channels in a direction vertical to a flow direction of the fluid flowing through the first and second channels by operation of the pump device are larger on a downstream side of the flow than on an upstream side, and the pump device comprises:
a chamber connected to the first and second channels;
a diaphragm which also serves as a portion of the wall of the chamber; and
vibration device for vibrating the diaphragm.

To achieve the objects, according to an eleventh aspect of the present invention, there is provided the variable-profile mirror according to the tenth aspect wherein a resonance frequency of the diaphragm of the pump device is higher than a resonance frequency of the flexible thin film.

To achieve the objects, according to a twelfth aspect of the present invention, there is provided the variable-profile mirror according to the ninth aspect, further comprising: a plurality of the first and second channels; and a plurality of the pump device, wherein at least one of the pump device is connected via the first channel in such a manner that the pressure chamber is pressurized, and connected to the outside via the second channel, and at least one of the other pump device is connected via another one of the first channels in such a manner that the pressure of the pressure chamber is reduced, and connected to the outside via another one of the second channels.

To achieve the objects, according to a thirteenth aspect of the present invention, there is provided the variable-profile mirror according to the ninth aspect wherein the substrate comprises single-crystal silicon, and the first and second channels are opened by anisotropic etching from different surfaces of the substrate.

Moreover, to achieve the objects, according to a fourteenth aspect of the present invention, there is provided a variable-profile optical element comprising:

a pressure-type variable-profile mirror in which a pressure is applied to a flexible thin film having an optical reflective surface and a shape of the flexible thin film is controlled;

an electrostatic variable-profile mirror in which a voltage is applied to the flexible thin film having the optical reflective surface and the shape of the flexible thin film is controlled; and light guiding device for guiding a reflected light from the pressure-type variable-profile mirror to the electrostatic variable-profile mirror, or guiding the reflected light from the electrostatic variable-profile mirror to the pressure-type variable-profile mirror.

Furthermore, to achieve the objects, according to a fifteenth aspect of the present invention, there is provided the variable-profile optical element according to the fourteenth aspect wherein the pressure-type variable-profile mirror comprises:

a frame member which supports the flexible thin film;

a substrate which is disposed opposite to the flexible thin film, and which is bonded to the frame member;

a pressure chamber which includes a space surrounded by the flexible thin film and the substrate, and in which the flexible thin film and the substrate form a portion of a wall;

a pump device which is disposed opposite the pressure chamber via the substrate, and which is bonded to the substrate;

a first channel which extends through the substrate, and which connects the pressure chamber to the pump device; and a second channel which connects the pump device to the outside, wherein the pump device sucks or discharges fluid with respect to the pressure chamber through the first and second channels and a profile of the flexible thin film may be varied.

Additionally, to achieve the objects, according to a sixteenth aspect of the present invention, there is provided the variable-profile optical element according to the fifteenth aspect wherein sectional areas of the first and second channels in a direction vertical to a flow direction of the fluid flowing through the first and second channels by operation of the pump device are larger on a downstream side of the flow than on an upstream side, and the pump device comprises:

a chamber connected to the first and second channels;
a diaphragm which also serves as a portion of the wall of the chamber; and
a vibration device which vibrates the diaphragm.

Moreover, to achieve the objects, according to a seventeenth aspect of the present invention, there is provided the variable-profile optical element according to the sixteenth aspect wherein a resonance frequency of the diaphragm of the pump device is higher than a resonance frequency of the flexible thin film.

Furthermore, to achieve the objects, according to an eighteenth aspect of the present invention, there is provided the variable-profile optical element according to the fifteenth aspect, further comprising: a plurality of the first and second channels; and a plurality of the pump device, wherein at least one of the pump device is connected via the first channel in such a manner that the pressure chamber is pressurized, and connected to the outside via the second channel, and at least one of the other pump device is connected via another one of the first channels in such a manner that the pressure of the pressure chamber is reduced, and connected to the outside via another one of the second channels.

Additionally, to achieve the objects, according to a nineteenth aspect of the present invention, there is provided the variable-profile optical element according to the fifteenth aspect wherein the substrate comprises single-crystal silicon, and the first and second channels are opened by anisotropic etching from different surfaces of the substrate.

Moreover, to achieve the objects, according to a twentieth aspect of the present invention, there is provided the variable-profile optical element according to the fourteenth aspect wherein the electrostatic variable-profile mirror comprises:

an electrode disposed on a back surface of the optical reflective surface of the flexible thin film;

a frame member which supports the flexible thin film;

a substrate which is disposed opposite to the flexible thin film, and which is bonded to the frame member; and a plurality of electrodes disposed opposite to the flexible thin film on the substrate surface.

Furthermore, to achieve the object, according to a twenty-first aspect of the present invention, there is provided the variable-profile optical element according to the twentieth aspect wherein a voltage correlated with a deformed amount of the pressure-type variable-profile mirror is selectively applied to the plurality of electrodes on the substrate so as to correct an aberration generated by the reflected light from the pressure-type variable-profile mirror having the flexible thin film deformed by the pressure applied to the flexible thin film of the pressure-type variable-profile mirror.

Additionally, technical terms for use in the above-described constitution and the present specification are based on the following definitions.

Variable-profile optical device: an optical device having a profile controlled by a pressure, electrostatic force, and the like, so that the focus distance may be varied.

Diaphragm: a vibrating thin film, diaphragm.

Pressure chamber: a space in which the pressure is applied to the elastic portion of the variable-profile optical device.

Micro electromechanical system (MEMS): a micro machine in which a semiconductor manufacturing process is used.

Chamber for exhaust: a chamber of an exhaust pump from the pressure chamber, including the diaphragm.

Chamber for suction: a chamber of a suction pump to the pressure chamber, including the diaphragm.

Chamber: a pressure chamber of the pump, including the diaphragm.

Nozzle: the nozzle connects the chamber to the pressure chamber or the outside, forms the channel of the fluid, and has different sectional areas on a chamber side and an opposite side.

Mark: a mark for matching/adjusting the optical axis of the optical device.

Channel: the channel includes the first channel for connecting the pressure chamber to the pump device, and the second channel for connecting the pump device to the outside, forms the channel of the fluid, and has different sectional areas on the pressure chamber side and the opposite side.

Additional objects and advantages of the invention will be set forth in the description which follows, and in part will be obvious from the description, or may be learned by practice of the invention. The objects and advantages of the invention may be realized and obtained by device of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the present invention.

FIGS. 16A and 16B are an upper surface perspective view showing the structure of the intermediate substrate 102 of the variable-profile mirror as the variable-profile optical device according to a fifth embodiment of the present invention, and a sectional view taken along 16B—16B of FIG. 16A;

DETAILED DESCRIPTION OF THE INVENTION

Figure 1A:
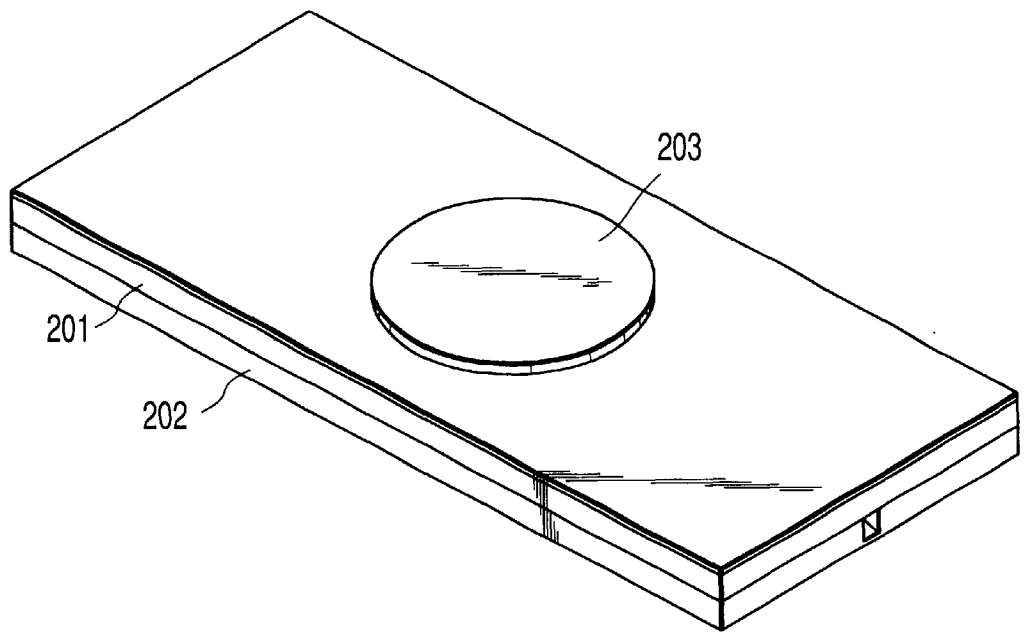
FIGS. 1A and 1B are an upper surface perspective view and a rear surface perspective view showing a whole constitution of a variable-profile optical device according to a first embodiment of the present invention.

Reference will now be made in detail to the presently preferred embodiments of the invention as illustrated in the accompanying drawings, in which like reference numerals designate like or corresponding parts.

Embodiments of the present invention will be described hereinafter with reference to the drawings.

(First Embodiment)

A first embodiment of the present invention will be described with reference to FIGS. 1A to 4C.

Figure 1B:
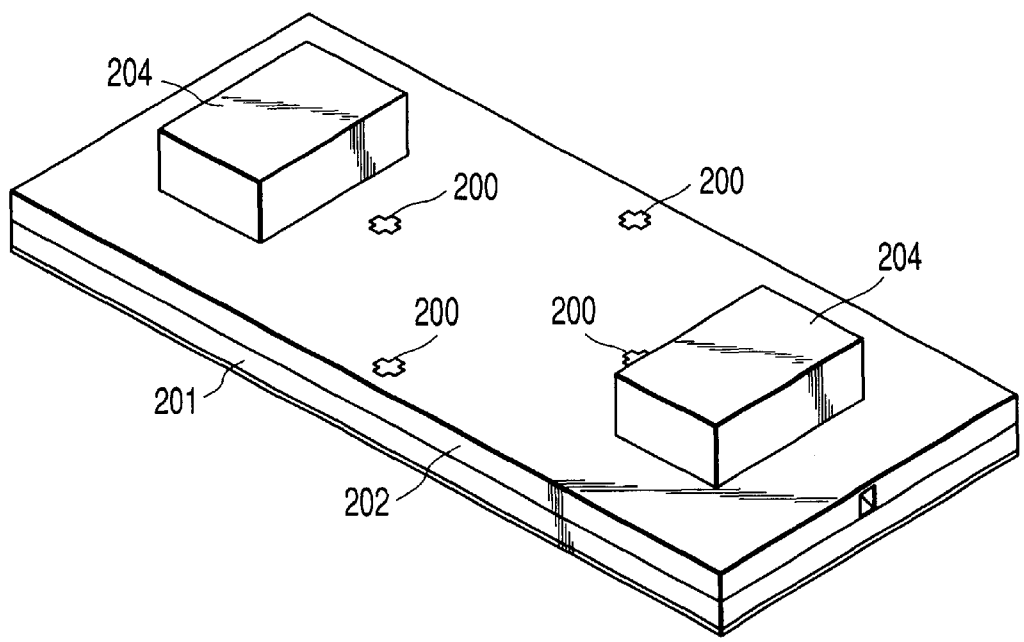

FIGS. 1A and 1B are an upper surface perspective view and rear surface perspective view showing the whole constitution of a variable-profile optical device according to the first embodiment of the present invention.

As shown in FIGS. 1A and 1B, the variable-profile optical device is constituted by bonding an upper substrate 201 to a lower substrate 202, and a transparent flexible thin film member 203 is formed on the upper substrate 201.

Moreover, two piezoelectric vibrators 204, and cross-shaped mark patterns 200 formed of four aluminum thin films are formed in the lower substrate 202.

Electrodes of the respective piezoelectric vibrators 204 are connected to lead wires, and connected to an external driving pulse generator (not shown).

Figure 2A:
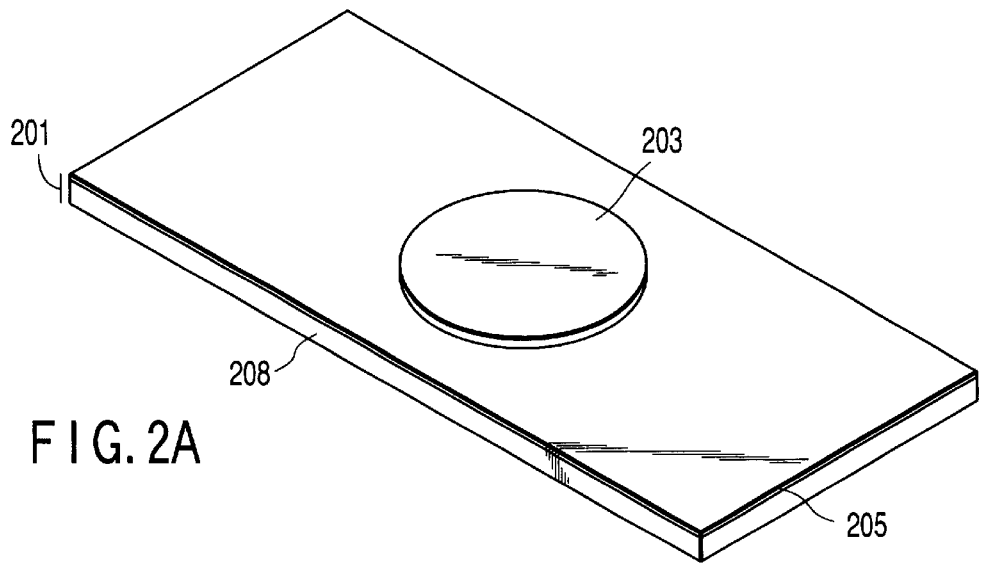
FIGS. 2A, 2B and 2C are an upper surface perspective view, a rear surface perspective view, and a sectional view showing a structure of an upper substrate 201 of FIG. 1.
Figure 2B:
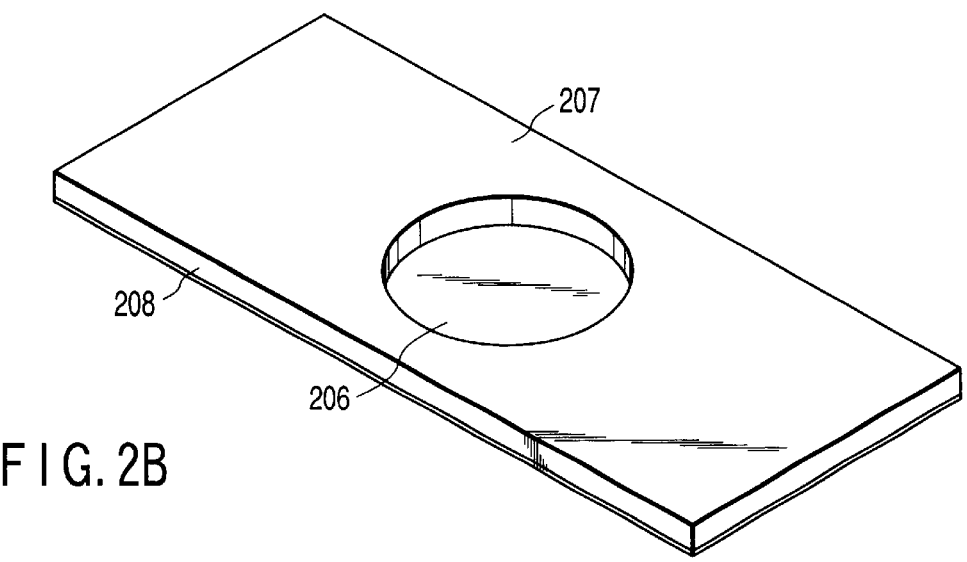
Figure 2C:
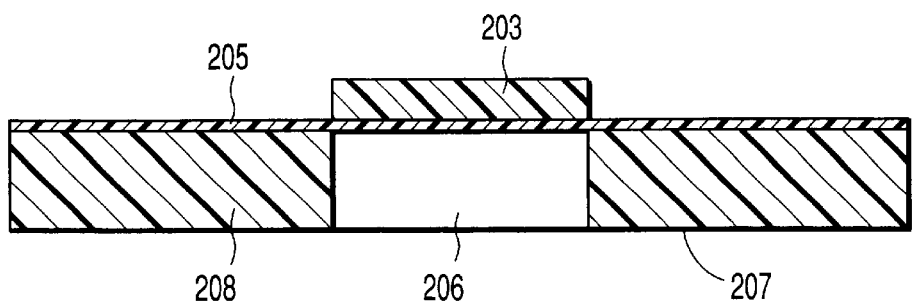

FIGS. 2A, 2B and 2C are an upper surface perspective view, rear surface perspective view and sectional view showing the structure of the upper substrate 201 of FIGS. 1A and 1B.

First, as shown in FIG. 2A, a polyimide thin film 205 having a thickness of 1 µm is formed on the upper surface of a substrate 208 of single-crystal silicon constituting the upper substrate 201.

Moreover, in a region in which the flexible thin film member 203 of the substrate 208 is formed, as shown in FIG. 2B, a circular opening 206 is formed.

Here, as shown in FIG. 2C, a back surface 207 of the substrate 208 constitutes a bonding surface with the lower substrate 202.

Figure 3A:
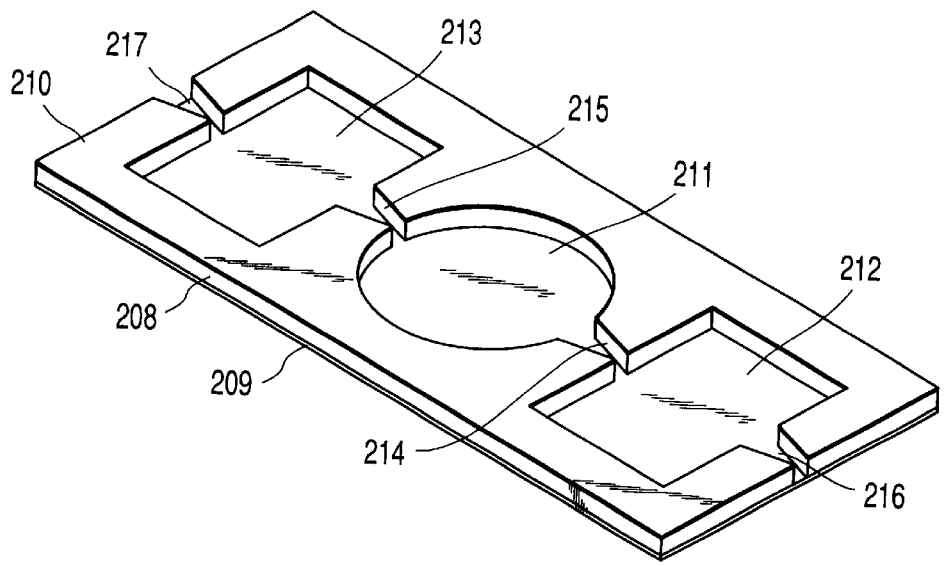
FIGS. 3A and 3B are an upper surface perspective view and a rear surface perspective view showing the structure of a lower substrate 202 of FIG. 1.
Figure 3B:
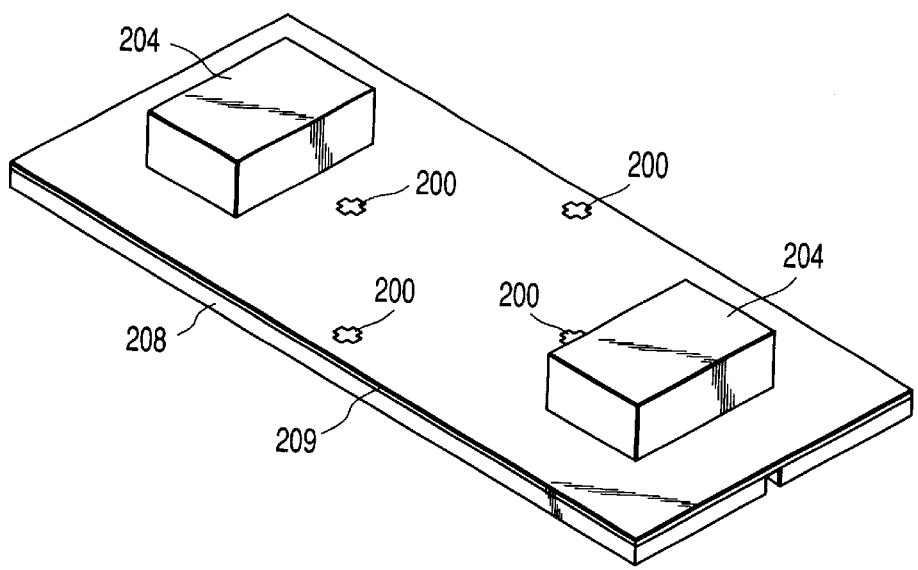

FIGS. 3A and 3B are an upper surface perspective view and rear surface perspective view showing the structure of the lower substrate 202 of FIGS. 1A and 1B.

As shown in FIGS. 3A and 3B, the lower substrate 202 is structured by laminating a silicon oxide film 209 on the single-crystal silicon substrate 208.

Moreover, a surface 210 of the single-crystal silicon substrate 208 of the lower substrate 202, on which the silicon oxide film 209 is not formed, constitutes a bonding surface with the upper substrate 201.

Furthermore, for the single-crystal silicon substrate 208, a circular opening is formed in a portion disposed opposite to the circular opening 206 of the upper substrate 201, and a concave portion 211 in which only the silicon oxide film 209 remains is constituted.

Additionally, rectangular openings of the silicon substrate 208 are formed on opposite sides of the concave portion 211, and a chamber for suction 212 and a chamber for exhaust 213 are constituted in which only the silicon oxide film 209 remains.

Here, the chamber for suction 212 is connected to the concave portion 211 via a suction nozzle 214 constituted of a groove formed in the silicon substrate 208.

Moreover, the chamber for exhaust 213 is connected to the concave portion 211 via an exhaust nozzle 215 constituted of a groove formed in the silicon substrate 208.

Furthermore, a width of the suction nozzle 214 increases on a concave portion 211 side as shown in FIG. 3A.

Additionally, conversely, the width of the exhaust nozzle 215 is reduced on the concave portion 211 side.

Moreover, a suction-side opening 216 constituted of the groove formed in the silicon substrate 208 is formed between the chamber for suction 212 and the end surface of the silicon substrate 208.

Furthermore, an exhaust-side opening 217 constituted of the groove formed in the silicon substrate 208 is formed between the chamber for exhaust 213 and the end surface of the silicon substrate 208.

Here, the width of the suction-side opening 216 is reduced on the end surface of the silicon substrate 208 as shown in FIG. 3A.

Moreover, conversely, the width of the exhaust-side opening 217 increases on the end surface of the silicon substrate 208.

The structure of the flexible thin film member 203 will next be described with reference to FIGS. 4A, 4B and 4C.

Figure 4A:
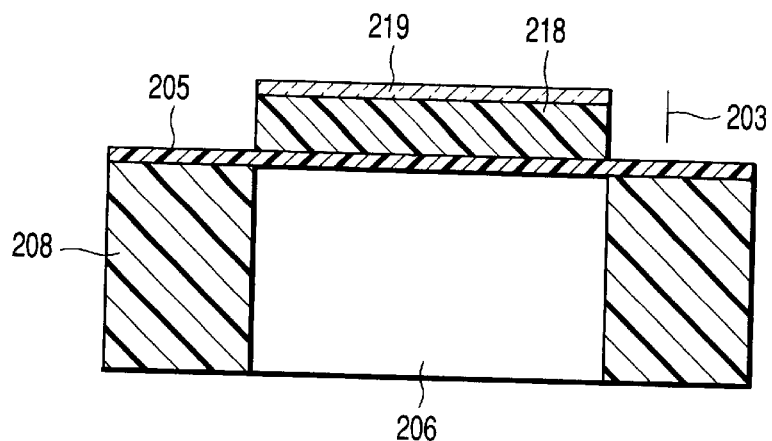
FIGS. 4A, 4B and 4C are sectional views showing the structure and operation of a flexible thin film member 203 of FIG. 1.
Figure 4B:
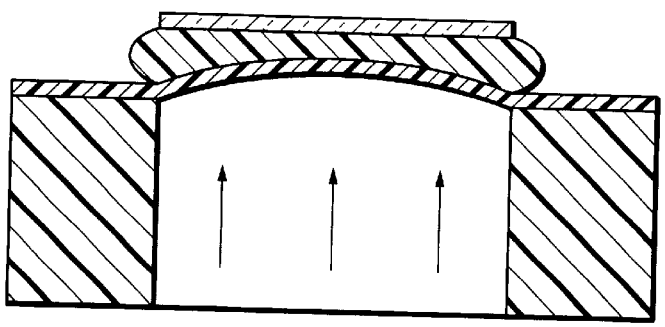
Figure 4C:
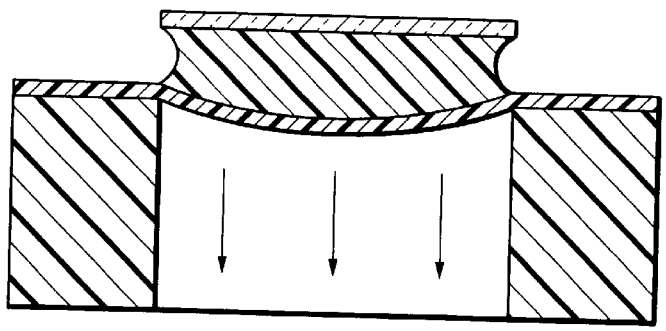

FIGS. 4A, 4B and 4C are sectional views showing the structure and operation of the flexible thin film member 203 of FIG. 1A.

As shown in FIG. 4A, the flexible thin film member 203 disposed on the polyimide thin film 205 in the region of the opening 206 of the single-crystal silicon substrate 208 has a double layer structure of a transparent gelled soft member 218 on a polyimide thin film side, and a glass thin plate 219 with which the member is coated.

In this structure, when a positive pressure is applied from an opening 206 side, as shown in FIG. 4B, the polyimide thin film 205 is pushed upwards and deformed in a convex shape. However, the glass thin plate 219 on the upper surface has a sufficiently high rigidity, and is therefore moved slightly upwards as a whole, but maintains its planar shape.

Therefore, the gelled soft member 218 has a thin center portion and a thick peripheral portion, and functions as a concave lens.

Conversely, when a negative pressure is applied from the opening 206 side, as shown in FIG. 4C, the polyimide thin film 205 is pushed downwards and deformed in a concave shape. However, the glass thin plate 219 on the upper surface has a sufficiently high rigidity, and is therefore moved slightly downwards as a whole, but maintains its planar shape.

Therefore, the gelled soft member 218 has a thick center portion, and a thin peripheral portion, and functions as a convex lens.

When the pressure of the opening 206 is controlled in this manner, the flexible thin film member 203 continuously changes to the convex lens from the concave lens.

This method is simple in structure and suitable particularly for miniaturization, as compared with a method of using a liquid reservoir to deform an elastic thin film, or a method of sealing an elastic member in a container as described in Jpn. Pat. Appln. KOKAI Publication No. 3-27090.

Moreover, here, the flexible thin film member 203 has the double layer structure of the soft member 218 and glass substrate 219. However, even with the use of a transparent material having rigidity continuously changing in a thickness direction in such a manner that the lower surface (surface in contact with the polyimide thin film 205) has a sufficiently low rigidity and the upper surface has a high rigidity, a similar effect is obtained.

Additionally, here, the soft member 218 is simply gelled, but the state is not particularly limited to the gelled state as long as the elasticity is sufficiently small in a range able to maintain the shape and the member is transparent.

An operation of the variable-profile optical device of the first embodiment will next be described.

That is, since the upper substrate 201 is bonded to the lower substrate 202, the opening 206 of the upper substrate and the concave portion 211 of the lower substrate constitute a pressure chamber.

Moreover, the chamber for suction 212 constitutes a chamber pump for suction which is vibrated by driving of the piezoelectric vibrators 204.

Here, the nozzle for suction 214 has a larger opening area on the pressure chamber side rather than on the pump side, and the opening on the pump side is larger than the end portion of the silicon substrate 208 in the suction side opening. Therefore, a flow directed to the pressure chamber from the outside air (outside the end portion of the silicon substrate 208) is generated.

On the other hand, the chamber for exhaust 213 is constituted of a chamber pump for exhaust which is vibrated by the driving of the piezoelectric vibrators 204.

Here, the nozzle for exhaust 215 has a smaller opening area on the pressure chamber side than on the pump side, and the opening on the pump side is smaller than the end portion of the silicon substrate 208 in the suction side opening. Therefore, a flow rate directed to the outside air (outside the end portion of the silicon substrate 208) from the pressure chamber is generated.

Additionally, an operation principle of such a diaphragm pump, that is, a valve-less diffuser pump is described in detail, for example, in J. Microeng. 9 (1999) 34–44, "A numerical design study of the valve-less diffuser pump using a lumped-mass model".

Here, for example, when the two piezoelectric vibrators 204 are driven with the same frequency and the same amplitude, the flow rates of two diaphragm pumps are balanced, and the flexible thin film member 203 maintains a neutral position.

Therefore, when the amplitude of the piezoelectric vibrator 204 on the chamber for suction 212 is set to be larger than the amplitude of the piezoelectric vibrator 204 on the chamber for exhaust 213, the pressure of the pressure chamber increases with respect to the outside air.

Moreover, conversely, when the amplitude of the piezoelectric vibrator 204 on the chamber for suction 212 is set to be smaller than the amplitude of the piezoelectric vibrator 204 on the chamber for exhaust 213, the pressure of the pressure chamber decreases with respect to the outside air.

When the amplitudes of two piezoelectric vibrators 204 are controlled in this manner, the pressure of the pressure chamber is continuously changed to a negative pressure from a positive pressure. As a result, the flexible thin film member 203 can continuously be changed to a concave lens from a convex lens.

As described above, according to the first embodiment, the micro pumps such as the valve-less diffuser pump in which a relatively large power amount can be obtained can be realized with a very simple constitution of two bonded substrates.

Furthermore, in the micro pumps such as the valve-less diffuser pump, there are no complicated elements such as valves, and the substrate can collectively be processed by a semiconductor manufacturing process. Therefore, when a photolithography technique is applied, a much smaller-sized device can be realized.

Additionally, in the first embodiment, the grooves forming the diaphragm, nozzles and openings are formed in the lower substrate, but may be formed in the upper substrate. Moreover, the lower substrate may just be a transparent flat plate.

A manufacturing method of the variable-profile optical device according to the first embodiment will next be described briefly.

The upper substrate 201, polyimide thin film 205, lower substrate 202, and silicon oxide film 209 are formed using general spin coating or LPCVD by a semiconductor process.

Moreover, the opening 206 of the upper substrate 201, concave portion 211 of the lower substrate 202, chamber for suction 212, chamber for exhaust 213, nozzle for suction 214, exhaust nozzle 215, suction-side opening 216, and exhaust-side opening 217 can finely be processed by reactive ion etching (RIE) for use in a general MEMS technique.

Furthermore, the marks 200 can highly precisely be formed by sputtering of an aluminum thin film and photolithography.

The flexible thin film member 203 can be formed by screen printing, spin coating, and various chemical treatments depending on the material.

In an actual manufacturing process, a large number of upper substrates 201 and lower substrates 202 are formed on a silicon wafer (substrate 208), the respective substrates 201, 202 are collectively bonded, and subsequently respective unit variable-profile optical devices are separated from one another by dicing.

For the piezoelectric vibrators 204, a method of individually bonding the devices obtained by cutting a bulk material, a method of forming the vibrators on the substrate with a sol-gel process, and the like are possible.

As described above, in the variable-profile optical device of the first embodiment, the semiconductor manufacturing process or a derived MEMS technique can be applied in most of the manufacturing steps, and therefore the device is advantageous particularly in miniaturization and cost reduction.

Moreover, in the first embodiment, the variable-profile lens has been described. However, as in a second embodiment described later, the portion of the flexible thin film member 203 on the polyimide thin film 205 is coated with an aluminum vapor deposited film, and a variable-profile mirror can be made in which the polyimide thin film 205 is deformed in the region of the concave portion 211.

Finally, regarding the function of the marks 200, the marks function as alignment marks in assembly of the variable-profile optical device of the first embodiment into optics.

That is, since the upper substrate 201 is highly precisely bonded to the lower substrate 202, the marks 200 can be used as criteria to easily match an optical axis of the lens or the reflective mirror of the upper substrate 201 with a high precision.

(Second Embodiment)

The second embodiment of the present invention will be described with reference to FIGS. 5A, 5B and 5C.

Figure 5A:
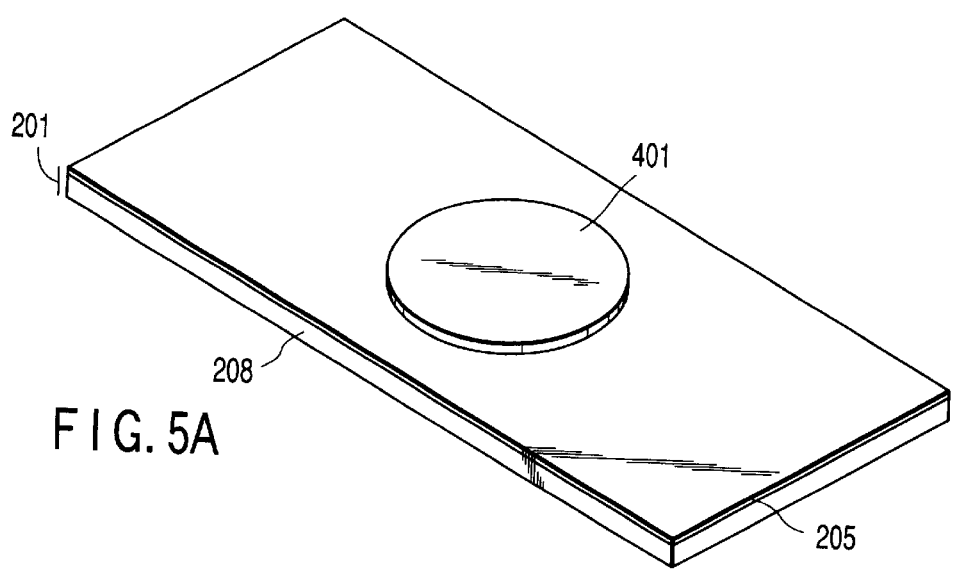
FIGS. 5A, 5B and 5C are an upper surface perspective view, a rear surface perspective view, and a sectional view showing the structure of the upper substrate 201 of the variable-profile optical device according to a second embodiment of the present invention.
Figure 5B:
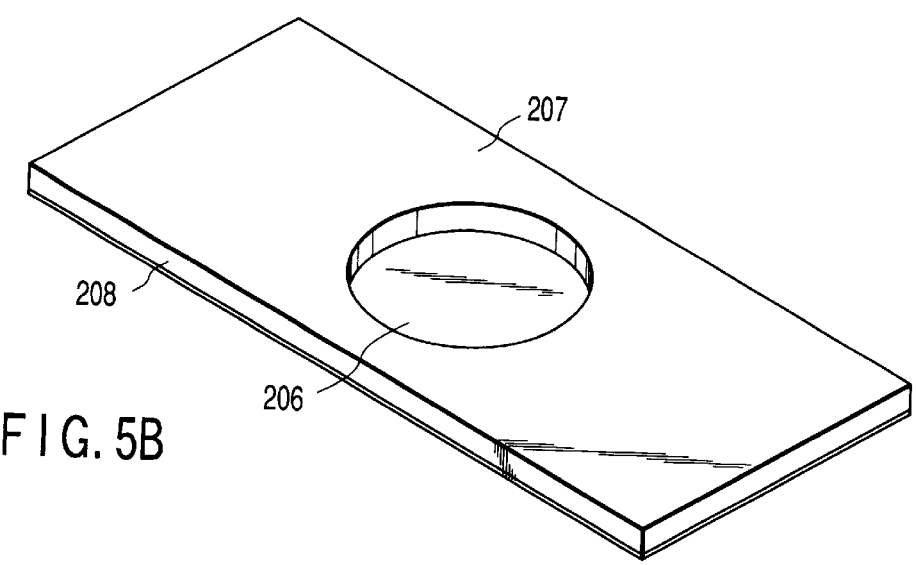
Figure 5C:
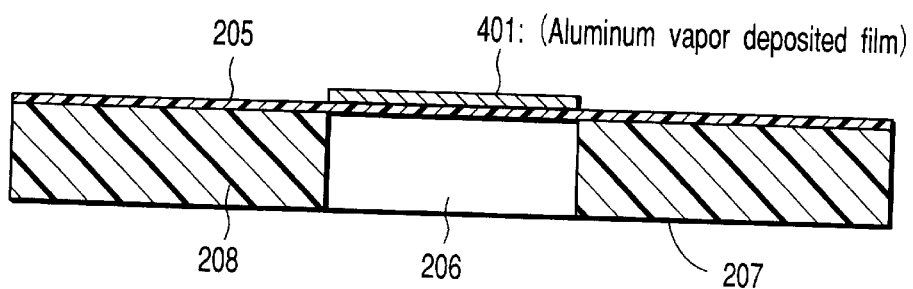

FIGS. 5A, 5B and 5C are an upper surface perspective view, rear surface perspective view, and sectional view showing the structure of the upper substrate 201 of the variable-profile optical device according to the second embodiment of the present invention.

Additionally, the constitution of each part not described here is assumed to be similar to that of the first embodiment.

In the second embodiment, the portion of the flexible thin film member 203 on the polyimide thin film 205 of the first embodiment is coated with an aluminum vapor film, and the device can now function as a flexible mirror, that is, a variable-profile mirror in which a polyimide thin film 205 is deformed in the region of the concave portion 211.

First, as shown in FIG. 5A, the polyimide thin film 205 having a thickness of 1 μm is formed on the upper surface of the single-crystal silicon substrate 208, constituting the upper substrate 201.

Moreover, in the region of the substrate 208 in which an aluminum vapor deposited film 401 is formed, as shown in FIG. 5B, the circular opening 206 is formed.

Here, as shown in FIG. 5C, the back surface 207 of the substrate 208 serves as the bonding surface of the lower substrate 202.

Furthermore, the polyimide thin film 205 disposed on the upper substrate 201 is coated with the aluminum vapor deposited film 401, so that the flexible mirror, that is, the variable-profile mirror (reflective mirror) is constituted.

Additionally, when the variable focus reflective mirror is used in image forming optics, light is incident in an oblique direction, and therefore a large aberration is generated. However, when a high-precision image pick up is not necessary, or when the aberration can be corrected by a combination with a free curved surface reflective mirror, the variable focus reflective mirror is preferable because of its simple structure. Moreover, the mirror can be manufactured at low cost by the MEMS technique.

(Third Embodiment)

A third embodiment of the present invention will be described with reference to FIGS. 6A and 6B and FIGS. 7A and 7B.

Figure 6A:
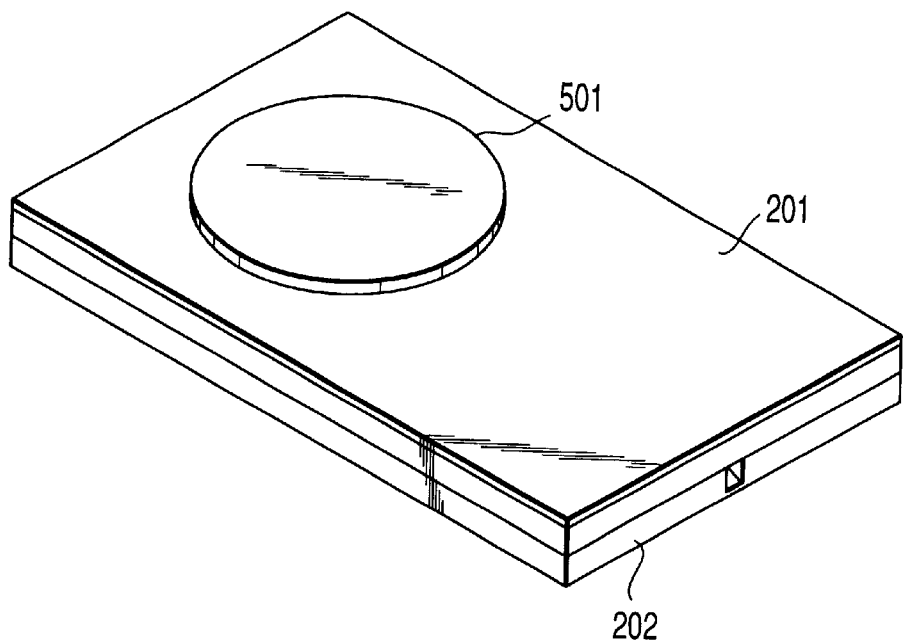
FIGS. 6A and 6B are an upper surface perspective view and a rear surface perspective view showing the whole constitution of the variable-profile optical device according to a third embodiment of the present invention.
Figure 6B:
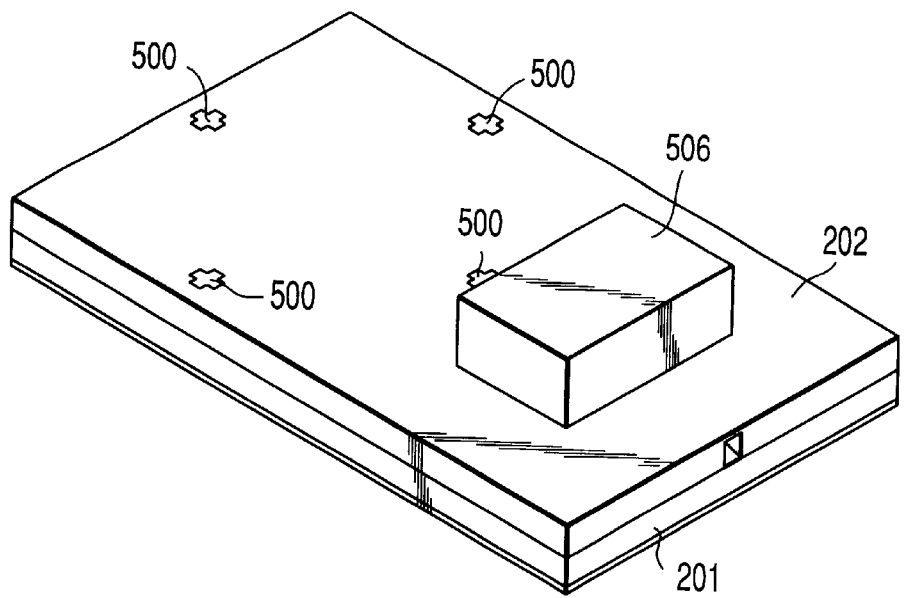

FIGS. 6A and 6B are an upper surface perspective view and rear surface perspective view showing the whole constitution of the variable-profile optical device according to the third embodiment of the present invention.

Figure 7A:
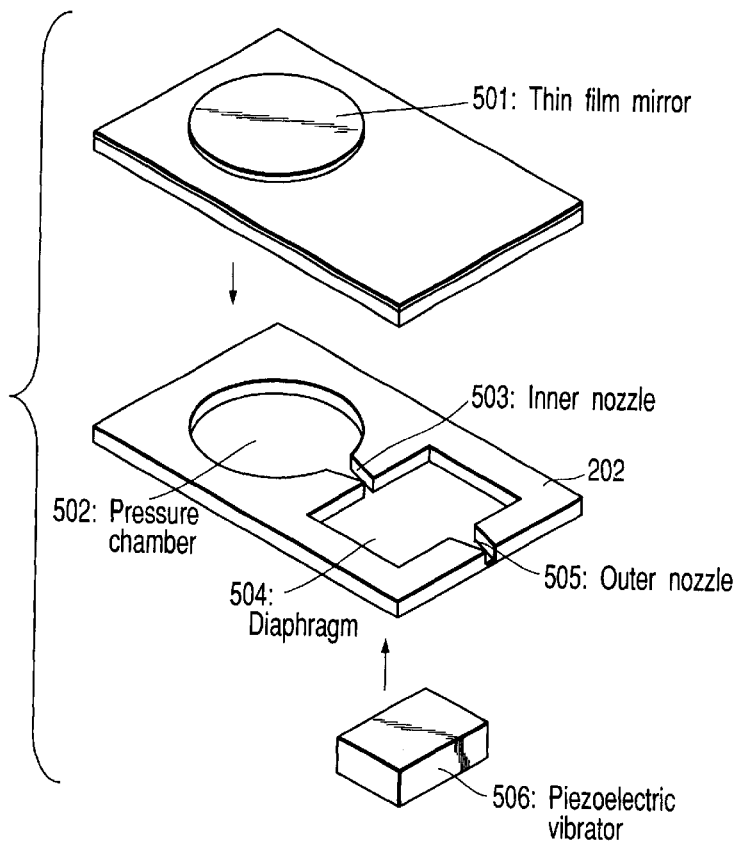
FIGS. 7A and 7B are an upper surface exploded perspective view and a rear surface exploded perspective view of the variable-profile optical device according to the third embodiment of the present invention.
Figure 7B:
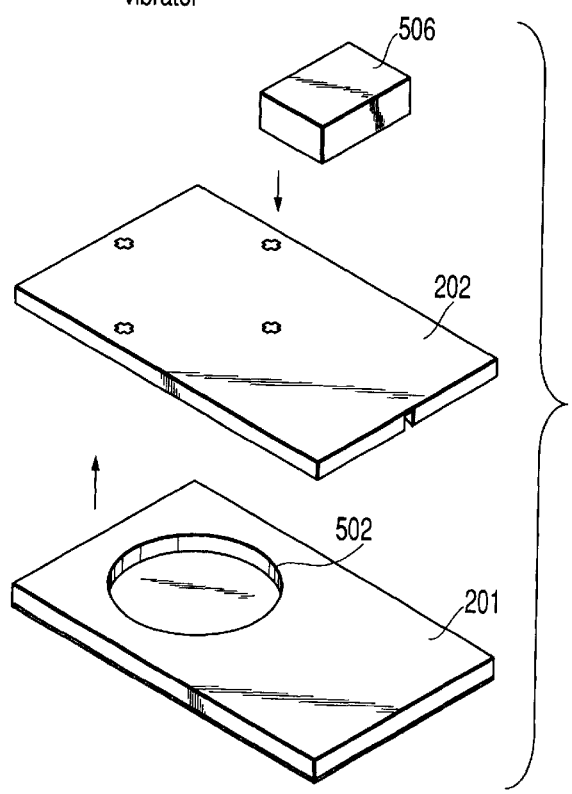

FIGS. 7A and 7B are an upper surface exploded perspective view and rear surface exploded perspective view of the variable-profile optical device according to the third embodiment of the present invention.

Additionally, the constitution of each part not shown here is assumed to be constituted similarly as the first and second embodiments.

In the third embodiment, instead of two piezoelectric vibrators 204 of the first embodiment, and two diaphragm pumps, as shown in FIGS. 6A and 6B and FIGS. 7A and 7B, one piezoelectric vibrator 506, and one diaphragm pump, that is, one valve-less diffuser pump are constituted.

Concretely, as shown in FIGS. 7A and 7B, a thin film mirror (or lens) 501 is formed in a position corresponding to that of the flexible thin film member 203 of the first embodiment in the upper substrate 201.

Moreover, in the lower substrate 202, a pressure chamber 502 corresponding to the opening 206 of the first embodiment, a diaphragm 504 connected to the pressure chamber 502 via an inner nozzle 503, and an outer nozzle 505 connected to the other end of the diaphragm 504 are formed.

Furthermore, in the lower substrate 202, the piezoelectric vibrator 506 is disposed for the diaphragm 504, and cross-shaped marks 500 are formed.

Here, the inner nozzle 503 and outer nozzle 505 are formed in shapes corresponding to the shapes of the nozzle for suction 214 and suction-side opening 216 of the first embodiment.

In this constitution, when the diaphragm 504 operates by the driving of the piezoelectric vibrator 506, the flow rate is generated in a direction to the inner nozzle 503 from the outer nozzle 505, the pressure of the pressure chamber 502 increases, and the thin film mirror 501 is deformed in a concave shape.

Moreover, when the piezoelectric vibrator 506 stops, the thin film mirror 501 has a flat shape because of a film tension of the thin film mirror 501.

Therefore, when the driving voltage of the piezoelectric vibrator 506 is adjusted, the thin film mirror 501 can continuously be deformed into a convex surface from the flat surface.

Moreover, when the shapes of the outer nozzle 505 and inner nozzle 503 are reversed, the thin film mirror (or lens) continuously deformed into a concave surface from a flat surface can be realized.

As described above, in the third embodiment in which one diaphragm, that is, one valve-less diffuser pump is constituted, as compared with the first embodiment including two diaphragm pumps, the mirror can be deformed only into a concave surface or concave surface, but further miniaturization is realized.

Additionally, when the flexible thin film member 203 of the first embodiment is used in addition to the thin film mirror 501, a similar effect can also be expected.

As described above, the variable-profile optical devices according to the first to third embodiments of the present invention include (1) a device in which a rigid transparent member is attached as the variable-profile lens to one surface of the transparent elastic member, and (2) a device in which a reflective material is attached as the variable-profile mirror to one surface of the flexible thin film member, and the valve-less diffuser pump (diaphragm pump) is used as pressure applying device.

Moreover, in the structure, the elastic portion of the variable-profile optical device is disposed to abut on one portion of the pressure chamber, and the "pressure chamber" and "pump for supplying the pressure to the pressure chamber" are disposed in the same structural member.

Furthermore, for the control, when the vibration amplitude and frequency of the pump (diaphragm) are controlled, the focus distance of the variable-profile optical device is set to a desired value.

In the variable-profile optical devices according to the first to third embodiments of the present invention, assembly properties of the optical device can be enhanced.

Particularly, (1) the variable-profile lens can easily be manufactured by spin-coating and cutting in a rigid material form.

Moreover, since (2) the variable-profile mirror can be manufactured using the MEMS manufacturing process, the productivity is improved similarly as described above.

Furthermore, in the variable-profile optical devices according to the first to third embodiments of the present invention, the assembly properties of the optical device and unit (pump portion) can be enhanced.

Particularly, since the pressure chamber, and pump chamber are disposed in the same structural member (substrate), and the substrate materials constituting the chambers are laminated, so that the assembly of the optical element with the micro pump attached thereto is completed. Therefore, even with a small size, the assembly properties are remarkably improved.

Additionally, examples of a preferable control method of the micro pump include a method of stopping the suction or discharge pump and adjusting the pressure of the pressure chamber, and further energy saving can be achieved.

Moreover, the first embodiment provides transmission optics, and therefore produces a characteristic effect that the aberration is smaller than that of the reflective optics as compared with the other embodiments.

Furthermore, the variable-profile optical device of the present invention including the optical device and unit (pump portion) is disposed in the shortest possible distance, and a response speed can be improved.

Additionally, in the variable-profile optical devices according to the first to third embodiments of the present invention, in addition to the above-described miniaturization and the improvement of assembly properties and response, the deformed amount of the optical device can be increased, and an obtained displacement amount is larger than that of the electrostatic driving type.

Therefore, as described above, according to the first to third embodiments of the present invention, there can be provided the high-response, small-sized, sufficient-displacement, and low-cost variable-profile optical device and optical element, and the small-sized, high-efficiency, and transmission type variable-profile optical device and optical element.

(Fourth Embodiment)

First, the variable-profile mirror according to a fourth embodiment of the present invention will be described with reference to FIGS. 8 to 15.

Figure 8:
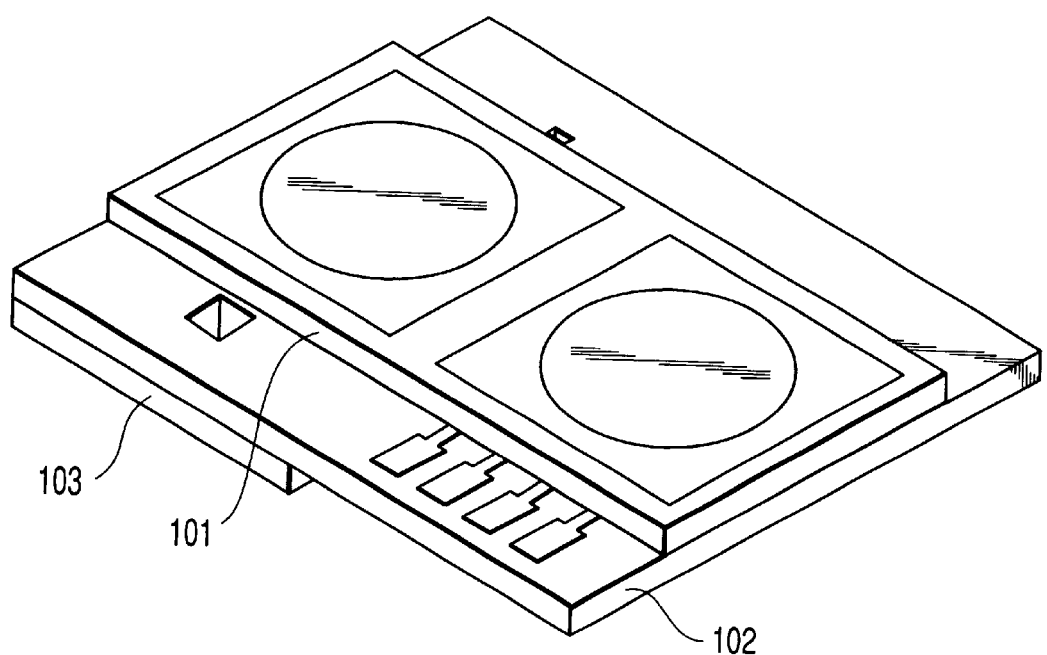
FIG. 8 is an upper surface perspective view showing the whole constitution of the variable-profile mirror as the variable-profile optical device according to a fourth embodiment of the present invention.

FIG. 8 is an upper surface perspective view showing the whole constitution of the variable-profile mirror as the variable-profile optical device according to the fourth embodiment of the present invention.

The variable-profile mirror as the variable-profile optical device of the fourth embodiment has a three-layers structure of an upper substrate 101, intermediate substrate 102, and lower substrate 103, and bonded portions among the respective substrates have an air-tight structure.

Figure 9A:
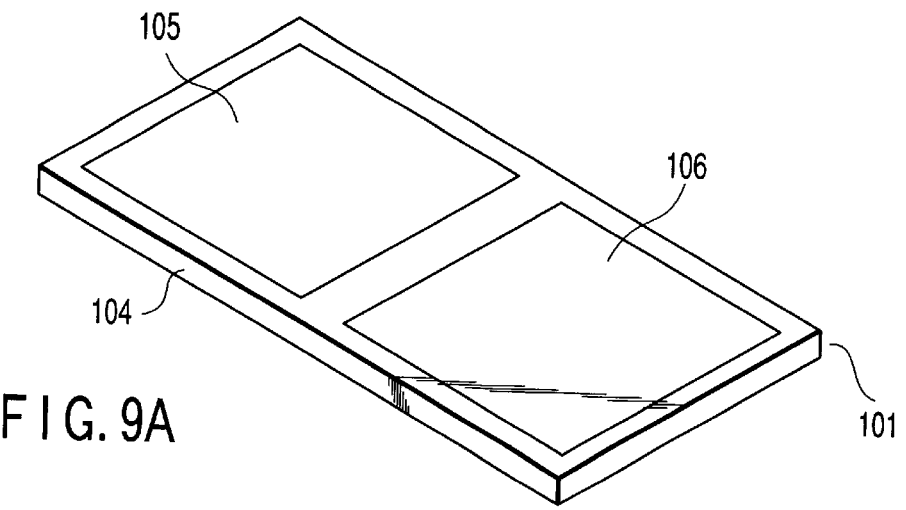
FIGS. 9A, 9B and 9C are an upper surface perspective view, a rear surface perspective view and a sectional view showing the structure of an upper substrate 101 of FIG. 8.
Figure 9B:
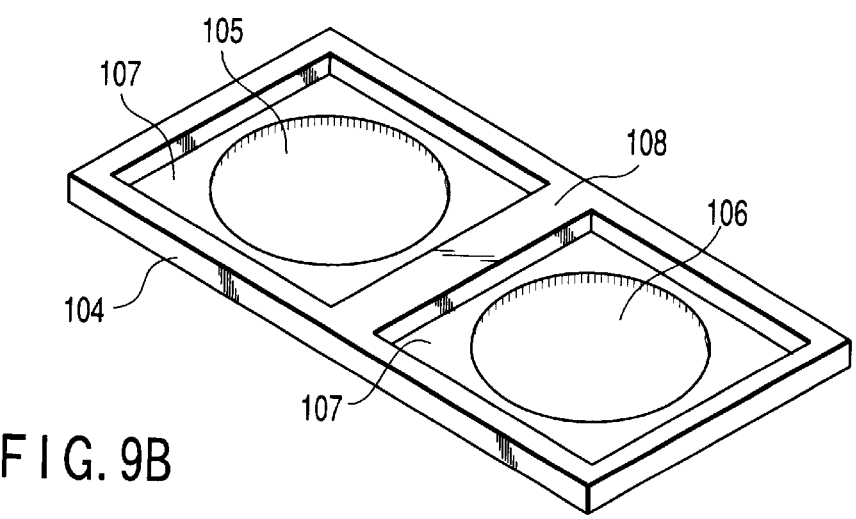
Figure 9C:
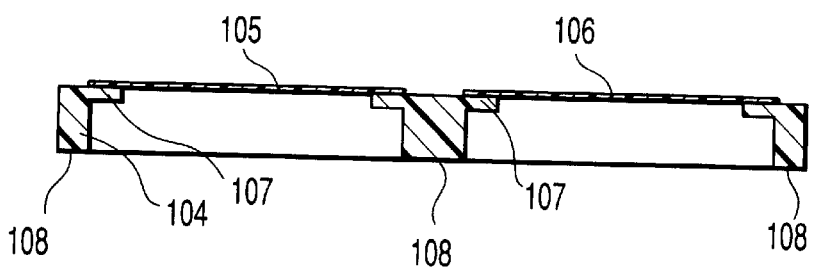

FIGS. 9A, 9B and 9C are an upper surface perspective view, rear surface perspective view and sectional view showing the structure of the upper substrate 101 of FIG. 8.

First, as shown in FIGS. 9A and 9B, two openings are disposed in a frame member 104 constituted of a substrate of single-crystal silicon having a thickness of 300 μm and constituting the upper substrate 101.

As shown in FIGS. 9A, 9B and 9C, a first flexible thin film 105 and second flexible thin film 106 constituted of two-layers films of a polyimide thin film having a thickness of 1 μm and an aluminum thin film having a thickness of 50 nm are formed in these two openings, respectively.

Here, each opening of the frame member 104 has a rectangular shape, but 20 μm thick single-crystal silicon thin portions 107 extend from the openings, and substantially circle openings are formed.

Additionally, a surface 108 of the frame member 104 in the rear surface perspective view shown in FIG. 9B forms a bonding surface to the intermediate substrate 102.

Moreover, the first flexible thin film 105 and second flexible thin film 106 function as a mirror in which the aluminum thin film forms the reflective surface.

Figure 10A:
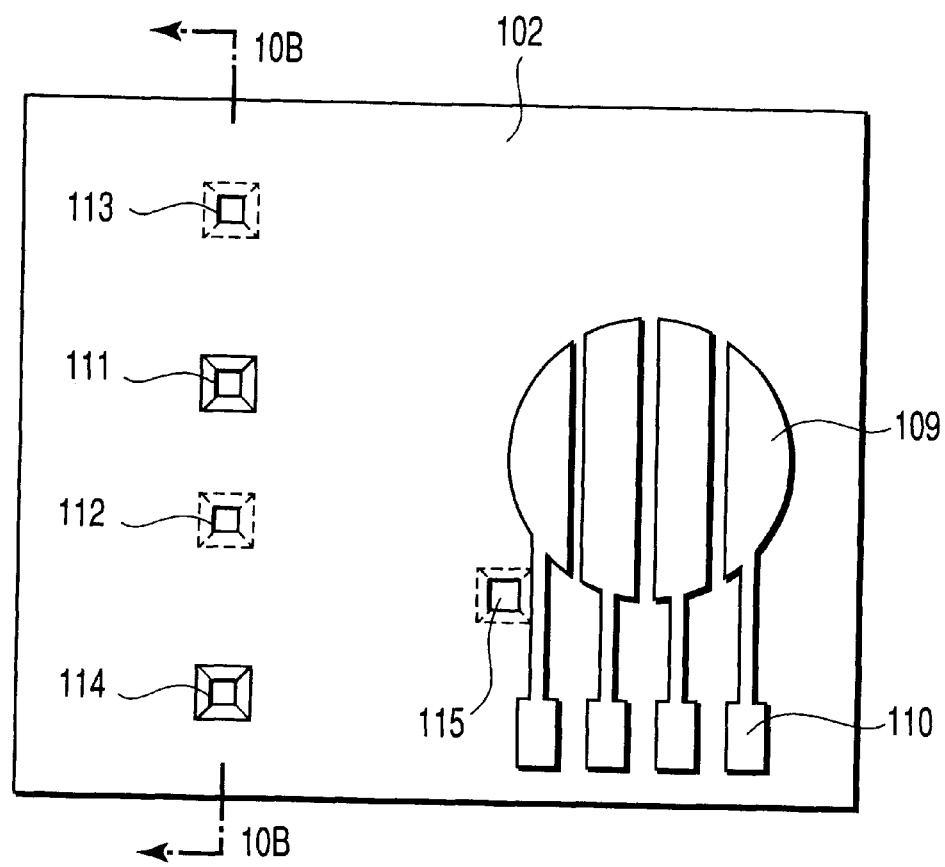
FIGS. 10A and 10B are an upper surface view showing the structure of an intermediate substrate 102 of FIG. 8 and a sectional view taken along a line 10B—10B of FIG. 10A.
Figure 10B:
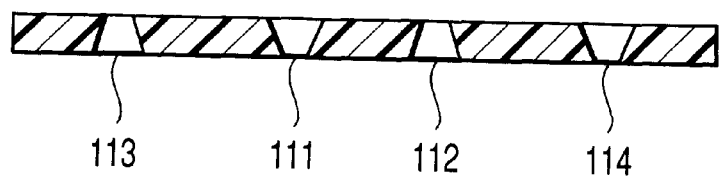

FIGS. 10A and 10B are an upper surface view showing the structure of the intermediate substrate 102 of FIG. 8 and a sectional view taken along a line 10B—10B of FIG. 10A.

Here, the surface of an upper surface portion in FIG. 10A constitutes the bonding surface to the upper substrate 101.

The intermediate substrate 102 is constituted of a 300 μm thick single-crystal silicon substrate, and an aluminum thin film electrode 109 is formed in a region disposed opposite to the circular opening defined by the thin portion 107 in the region corresponding to the second flexible thin film 106 of FIGS. 9A, 9B and 9C.

Moreover, the electrode 109 extends into electrode pads 110 for connection to external leads.

Furthermore, as seen from FIG. 10A, the electrode 109 is divided into a plurality of regions, and a plurality of electrode pads 110 are formed for a plurality of divided portions of the electrode 109.

Additionally, in the intermediate substrate 102, an opening for suction 111 and opening for exhaust 112 are formed in a region disposed opposite to the circular opening defined by the thin portion 107 in the region corresponding to the first flexible thin film 105 of FIGS. 9A, 9B and 9C.

Moreover, an opening for atmospheric suction 113 and opening for atmospheric exhaust 114 are formed outside a region of the intermediate substrate 102 to which the upper substrate 101 is bonded.

Furthermore, as seen from the 10B—10B sectional view shown in FIG. 10B, for the opening for suction 111 and opening for atmospheric exhaust 114, the opening areas on an upper substrate 101 side are formed to be larger than those on a lower substrate 103 side.

Additionally, for the opening for exhaust 112 and opening for atmospheric suction 113, the opening areas on the upper substrate 101 side are formed to be smaller than those on the lower substrate 103 side.

Moreover, in the intermediate substrate 102, a through hole 115 is formed in a region disposed outside the region opposite to the circular opening defined by the thin portion 107 of the second flexible thin film 106 of FIGS. 9A, 9B and 9C and opposite the inside of a rectangular opening defined by the frame member 104.

Furthermore, in the fourth embodiment, for each of the opening for suction 111, opening for atmospheric exhaust 114, opening for exhaust 112, and opening for atmospheric suction, a plurality of openings may be disposed.

Figure 11A:
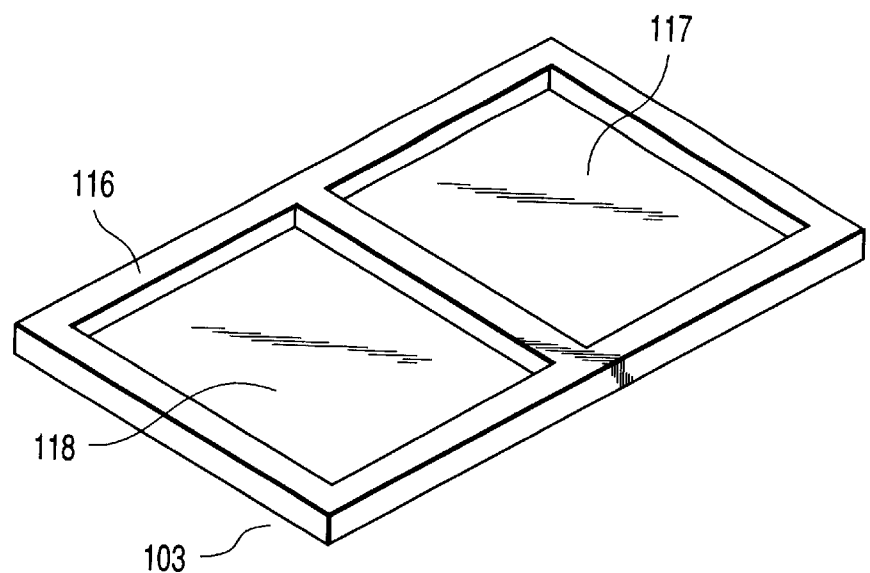
FIGS. 11A and 11B are an upper surface perspective view and a rear surface perspective view showing the structure of a lower substrate 103 of FIG. 8.
Figure 11B:
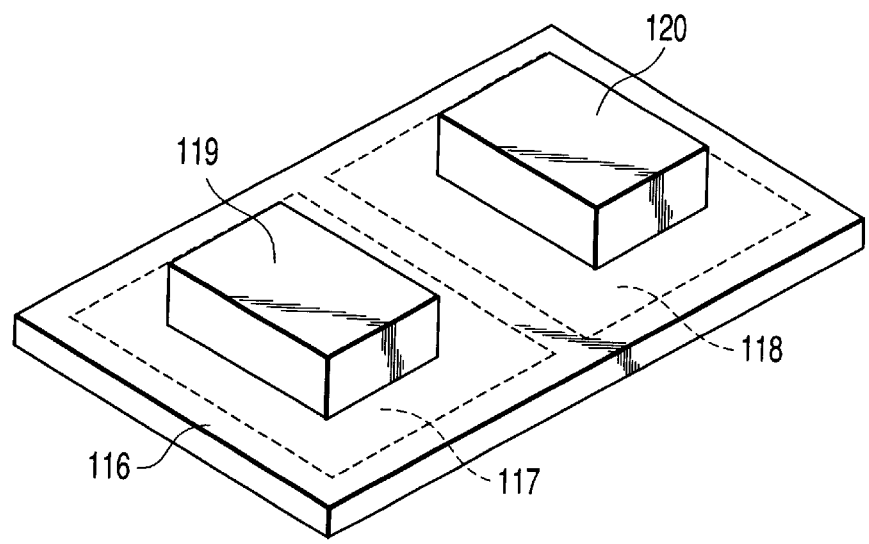

FIGS. 11A and 11B are an upper surface perspective view and rear surface perspective view showing the structure of the lower substrate 103 of FIG. 8.

In the lower substrate 103, a chamber for suction 117 and chamber for exhaust 118 are formed which are partitioned by a frame member 116 formed of single-crystal silicon having a thickness of 300 μm and each of which is formed of single-crystal silicon having a thickness of 40 μm.

Here, the surface of the frame member 116 in the upper surface perspective view shown in FIG. 11A forms the bonding surface to the intermediate substrate 102.

Moreover, in the rear surface perspective view shown in FIG. 11B, piezoelectric vibrators 119, 120 are formed on a side opposite to the intermediate substrate 102 side of the chamber for suction 117 and chamber for exhaust 118.

The operation of the variable-profile optical device in the fourth embodiment will next be described.

Figure 12:
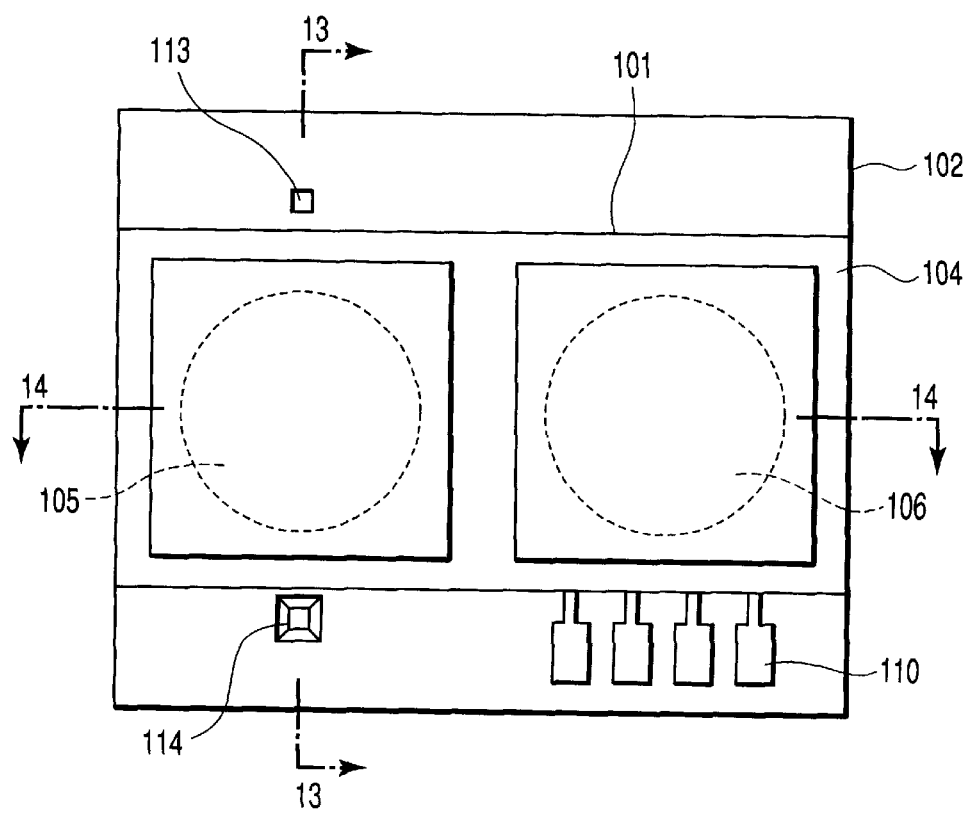
FIG. 12 is an upper surface view of the constitution shown in FIG. 8.
Figure 13:
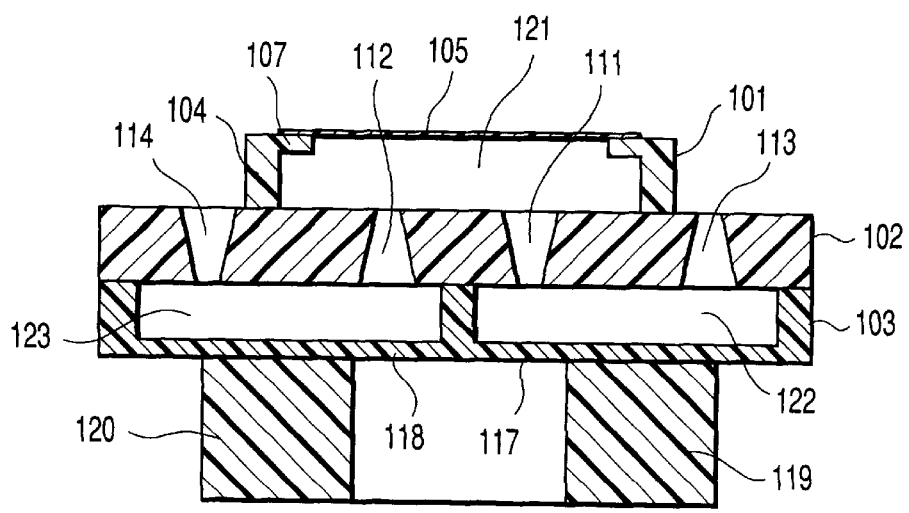
FIG. 13 is a sectional view taken along 13—13 of FIG. 12.
Figure 14:
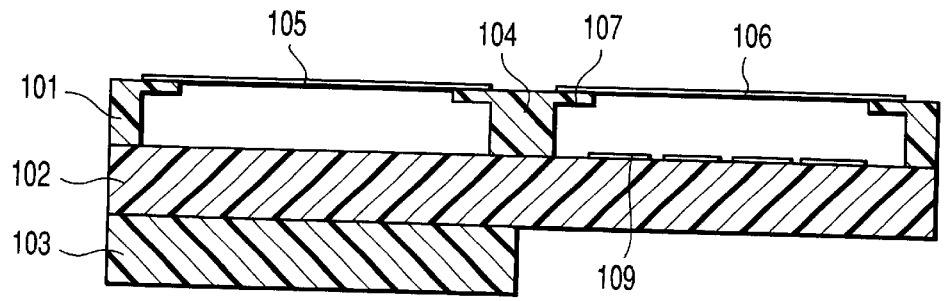
FIG. 14 is a sectional view taken along 14—14 of FIG. 12.

FIG. 12 is an upper surface view of the constitution shown in FIG. 8, and sectional views along 13—13 and 14—14 of FIG. 12 are shown in FIGS. 13 and 14, respectively.

First, the operation of the first flexible thin film 105 constituting a first optical device will be described with reference to FIG. 13.

The first flexible thin film 105 constitutes a part of a pressure chamber 121 having the frame member 104 by which the thin film is surrounded as a side surface, and having the intermediate substrate 102 as a bottom surface.

Moreover, the chamber for suction 117 and piezoelectric vibrator 119 constitute a first diaphragm pump 122, and the chamber for exhaust 118 and piezoelectric vibrator 120 constitute a second diaphragm pump 123.

Furthermore, as not particularly shown, the piezoelectric vibrators 119, 120 are connected to lead wires, respectively, and can individually be driven.

Here, when a high-frequency pulse voltage is applied to the piezoelectric vibrator 119 and the vibrator is vibrated, a flow rate directed to the pressure chamber 121 from the outside air (outside the opening for atmospheric suction 113) via the first diaphragm pump 122 is generated. This is because the opening for suction 111 has an inclined structure having a small opening area inside the first diaphragm pump 122, and conversely the opening for atmospheric suction 113 has an inclined structure having a large opening area inside the first diaphragm pump 122.

On the other hand, when the piezoelectric vibrator 120 is vibrated, conversely, the flow rate directed to the outside air (outside the opening for atmospheric exhaust 114) from the pressure chamber 121 via the second diaphragm pump 123 is generated.

Therefore, for example, when the piezoelectric vibrators 119, 120 are driven with the same frequency and the same amplitude, the flow rates of two diaphragm pumps 122, 123 are balanced, and the first flexible thin film 105 maintains a neutral position. However, when the amplitude of the piezoelectric vibrator 119 is set to be larger than the amplitude of the piezoelectric vibrator 120, the pressure of the pressure chamber 121 increases with respect to the outside air. Conversely, when the amplitude of the piezoelectric vibrator 119 is set to be smaller than the amplitude of the piezoelectric vibrator 120, the pressure of the pressure chamber 121 decreases with respect to the outside air.

Here, the circular opening defined by the thin portion 107 of the first flexible thin film 105 has a remarkably small rigidity as compared with other portions of the pressure chamber 121. Therefore, when the pressure of the pressure chamber 121 increases with respect to the outside air, the portion is deformed into a convex surface. When the pressure decreases with respect to the outside air, the portion is deformed into a concave surface. Thus, a circular variable-profile mirror is made possible.

In this case, the pressure of the pressure chamber 121 can easily be controlled by pulses for driving the piezoelectric vibrators 119, 120, and the pressure chamber 121 is partitioned from two diaphragm pumps 122, 123 simply with the intermediate substrate 102.

Therefore, the response is much enhanced, and smooth profile control of a convex surface from a concave surface is possible, with respect to the variable-profile mirror.

Additionally, in the constitution, different from the method of using the reservoir to constitute a closed space, the influence of a fluctuation of the external atmospheric pressure is-not exerted.

Moreover, in consideration of efficiency, driving frequencies of the piezoelectric vibrators 119, 120 are preferably set in the vicinity of the resonance frequencies of the diaphragms 117, 118.

Here, when the resonance frequencies of the diaphragms 117, 118 are set to be sufficiently larger than the resonance frequency of the first flexible thin film 105, the first flexible thin film 105 is prevented from being vibrated by the driving of the first diaphragm pump 122 and a stable image forming capability is obtained.

In this manner, in the fourth embodiment, the first and second diaphragm pumps 122, 123 as a pair of driving pumps are formed directly under the first flexible thin film 105 which functions as the variable focus mirror. Therefore, since it is unnecessary to draw around a tube, and the like, the variable-profile mirror having little loss, high efficiency, very small size, and high response can be realized.

Moreover, since the variable-profile mirror according to the fourth embodiment is constituted only of the substrate having a three-layers structure and the piezoelectric vibrator, the number of components is small, complicated mechanisms such as a valve are unnecessary, and therefore cost reduction is possible.

Furthermore, since the variable-profile mirror of the fourth embodiment is of the pump type, a much larger displacement can be obtained as compared with the variable-profile mirror of the electrostatic driving type.

The operation of the second flexible thin film 106 will next be described with reference to FIG. 14.

Here, it is assumed that for a potential, the aluminum thin film in the second flexible thin film 106 is grounded (not shown).

The second flexible thin film 106 is disposed opposite the electrodes 109 of the intermediate substrate 102 via the height of the frame member 104. When a high voltage is applied to the electrodes 109, the displacement is caused by the electrostatic attractive force in the circular opening defined by the thin portion 107 in the region of the second flexible thin film 106 having little rigidity.

Here, as shown in FIG. 10A, since the electrode 109 is divided into a plurality of regions, and when different voltages are applied to the electrode pads 110 extending from the respective electrodes 109, a rotationally symmetric deformation can be obtained.

Moreover, the through hole 115 of the intermediate substrate 102 functions as an air vent between the electrodes, and prevents the operation of an electrostatic actuator from being inhibited by a pressure difference from the outside generated by the deformation.

Additionally, needless to say, the divided shapes of the electrode 109 are designed in accordance with the deformed profile necessary during the application of voltage.

In general, for the variable-profile mirror of the pressure driving type such as the first flexible thin film 105, a large displacement can be obtained, but the deformed profile is a rotationally symmetrical profile because the applied force is uniform. Therefore, when a light flux is obliquely incident, a large aberration is generated.

On the other hand, with the variable-profile mirror of the electrostatic driving type such as the second flexible thin film 106, a rotationally symmetrical profile can relatively easily be obtained as described above, but it is disadvantageously difficult to obtain a large displacement.

Figure 15:
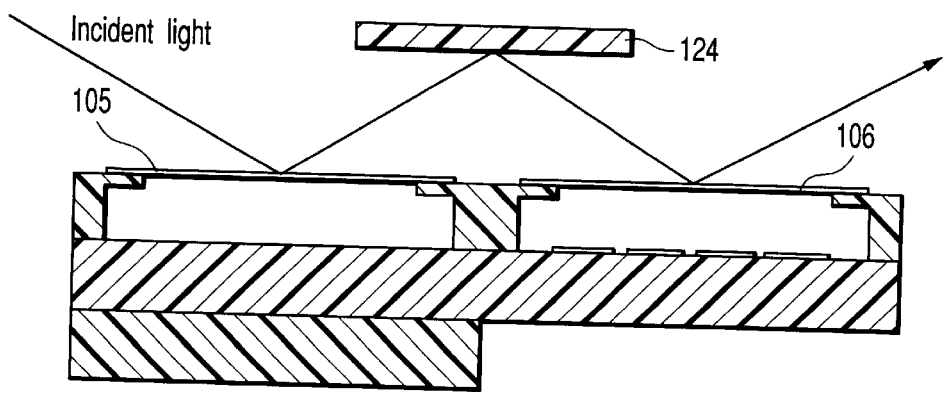
FIG. 15 is a side sectional view showing a modification example of a variable-profile mirror as the variable-profile optical device according to the fourth embodiment of the present invention.

To solve the problem, in the fourth embodiment, as shown in FIG. 15, when an external mirror 124 is used and the first flexible thin film 105 of the pressure driving type is combined and used with the second flexible thin film 106 of the electrostatic driving type, it is possible to realize a large change of curvature and aberration correction at the same time.

Here, since the first flexible thin film 105 and second flexible thin film 106 are formed as two variable-profile mirrors on the same substrate, the position precision among the respective variable-profile optical devices is very high. This is also advantageous in respect of miniaturization.

Additionally, in the fourth embodiment, the first flexible thin film 105 and second flexible thin film 106 are deformed in the circular region, but may, needless to say, be deformed in other profiles such as an ellipse, depending on the optics to be applied.

Moreover, in the fourth embodiment, two variable-profile mirrors are mounted on the same substrate. However, if necessary, three or more variable-profile mirrors may be mounted, or other optical devices such as a plane mirror and reflective diffraction grating may also be formed on the same substrate.

A manufacturing method of the variable-profile mirror as the variable-profile optical device in the fourth embodiment will next be described briefly with reference to FIGS. 23A to 25B.

Figure 23A:
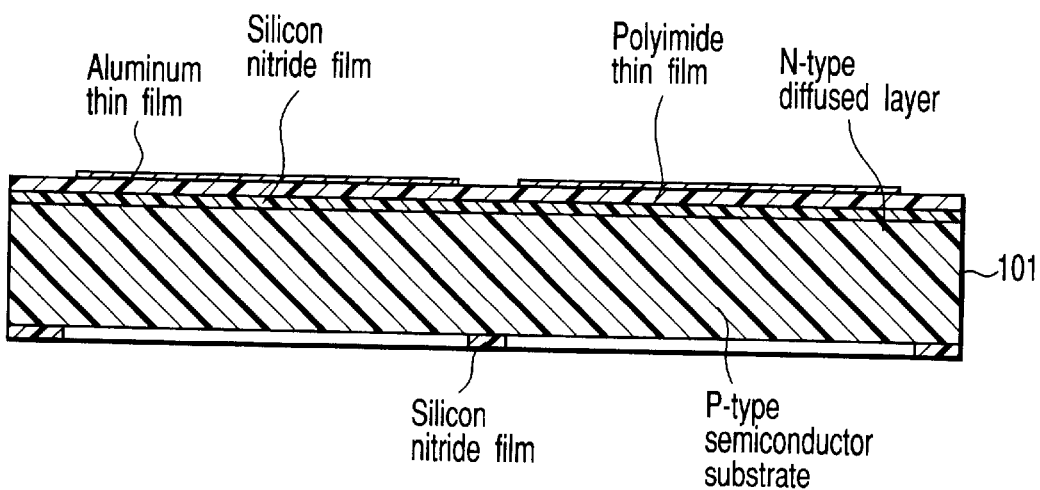
FIGS. 23A, 23B and 23C are sectional views showing manufacturing steps of the upper substrate 101 of FIG. 8.
Figure 23B:
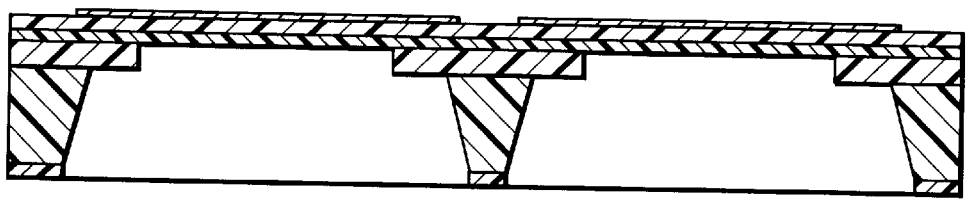
Figure 23C:
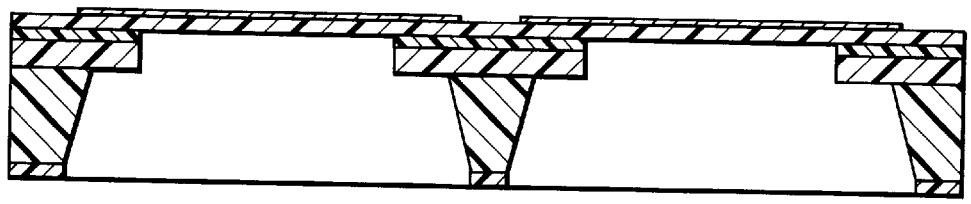

FIGS. 23A, 23B and 23C are sectional views showing manufacturing steps of the upper substrate 101.

As shown in FIG. 23A, N-type diffused layers are formed in regions corresponding to the thin portions 107 in a low-concentration P-type single-crystal silicon substrate having a plane orientation of <100>.

Subsequently, after silicon nitride films are formed on the opposite surfaces of the silicon substrates, the silicon nitride films corresponding to the regions of the rectangular openings defined by the frame member 104 in the back surface of the substrate are removed by photolithography.

Subsequently, as shown in FIG. 23B, a polyimide thin film and aluminum thin film are successively. formed on a front surface side by spin coating and sputtering, and patterned.

Subsequently, while the front surface side of the silicon substrate is protected and a positive voltage is applied to the N-type diffused layers, a strong alkali aqueous solution is used to perform an electrochemical etching from the region with the silicon nitride films removed therefrom on the back surface side of the silicon substrate.

In this case, the etching stops in the vicinity of a bonded ends, and the thin portions 107 can be left in the regions of the silicon substrate in which the N-type diffused layers are formed.

In the regions corresponding to the circular openings defined by the thin portions 107, when the silicon nitride film is exposed on the front surface side of the silicon substrate, the etching stops.

Subsequently, as shown in FIG. 23C, when the silicon nitride film on the back surface and the exposed silicon nitride film are removed from the back surface of the silicon substrate, the structure is obtained as shown in FIGS. 9A, 9B and 9C.

Figure 24A:
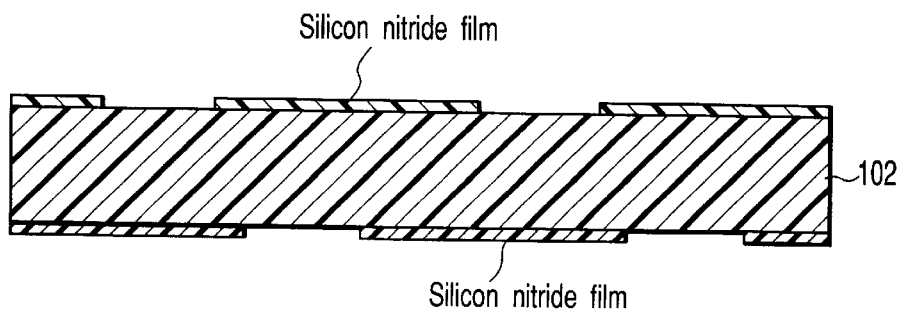
FIGS. 24A, 24B and 24C are sectional views showing the manufacturing steps of the intermediate substrate 102 of FIG. 8.
Figure 24B:
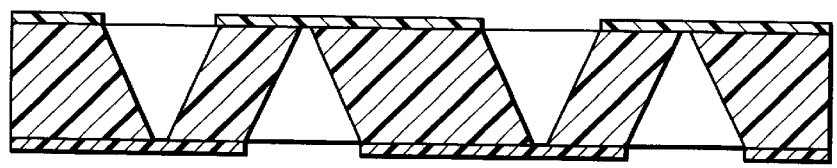
Figure 24C:
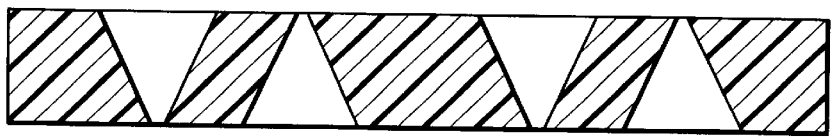

FIGS. 24A, 24B and 24C are sectional views showing the manufacturing steps of the intermediate substrate 102.

As shown in FIG. 24A, first the silicon nitride films are formed on the opposite substrates of the single-crystal silicon substrate, and the rectangular openings are formed in the silicon nitride films in the regions corresponding to the opening for suction 111 and opening for atmospheric exhaust 114 in the surface to which the upper substrate 101 is bonded by the photolithography technique.

Moreover, in the surface of the intermediate substrate 102 to which the lower substrate 103 is bonded, the rectangular openings are similarly formed in the silicon nitride films in the regions corresponding to the opening for exhaust 112, opening for atmospheric suction 113 and through hole 115.

Subsequently, when anisotropic etching is performed on the silicon substrate by a strong alkali aqueous solution, as shown in FIGS. 24B and 24C, the opening shapes shown in FIGS. 10A and 10B are obtained.

Here, when the opening shape of the silicon nitride film and the plane orientation of the substrate are appropriately set, the opening area on the side opposite to the opening surface of the silicon nitride film can be remarkably reduced.

It is possible to easily and steadily form a fine opening shape having the inclination by this technique as shown in FIGS. 9A, 9B and 9C.

Figure 25A:
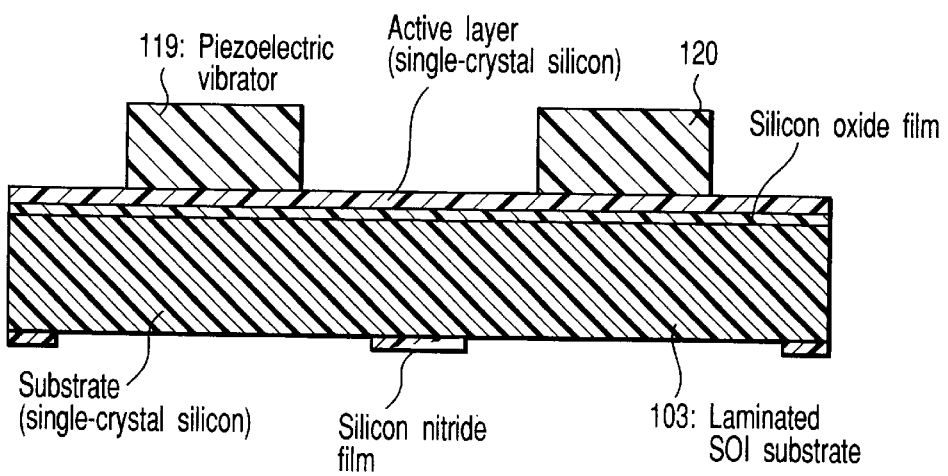
FIGS. 25A and 25B are sectional views showing the manufacturing steps of the lower substrate 103 of FIG. 8.
Figure 25B:
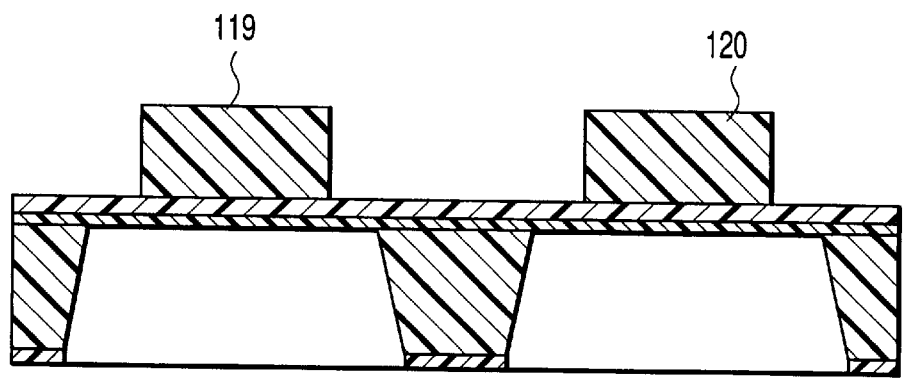
Figure 26:
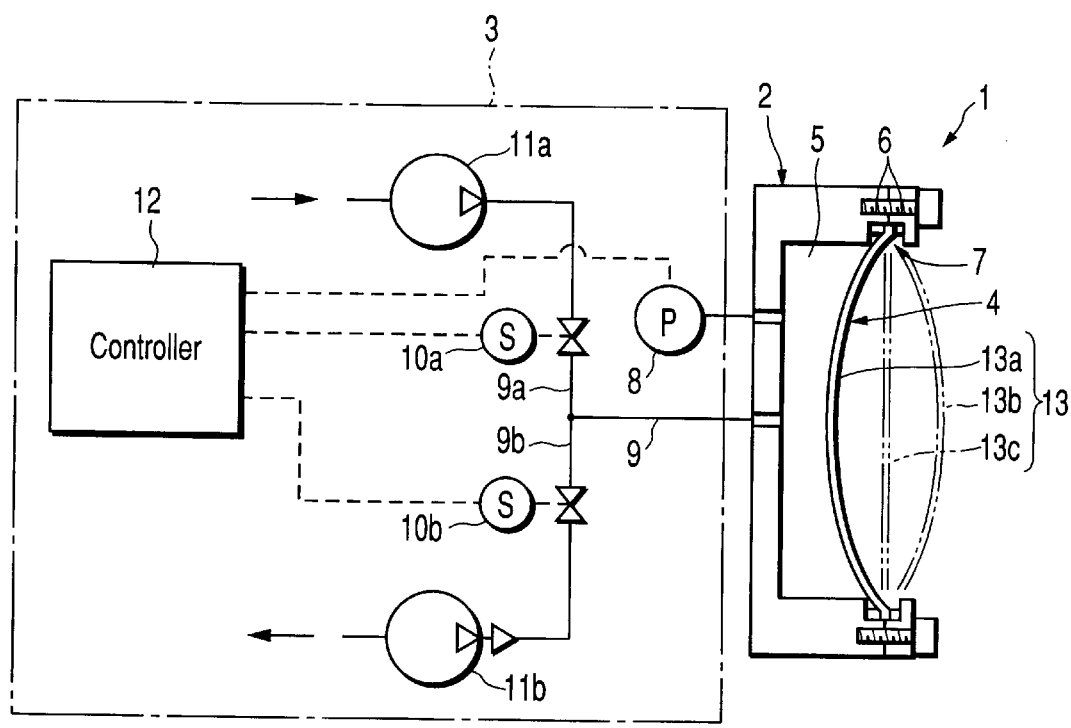
FIG. 26 is an explanatory view of a conventional art described in Jpn. Pat. Appln. KOKAI Publication No. 1-219801.

FIGS. 25A and 25B are sectional views showing the manufacturing steps of the lower substrate 103 in which a silicon-on-insulator (SOI) by a laminating system is used.

That is, for the lower substrate 103, as shown in FIGS. 25A and 25B, first the silicon-on-insulator (SOI) by the laminating system is used to form a mask pattern such as the silicon nitride film on the substrate back surface and an active layer on the front surface is protected. In this state, etching of the strong alkali aqueous solution is performed, the active layer is thereby allowed to remain, and the frame member 116 and diaphragms 117, 118 are formed.

Additionally, the piezoelectric vibrators 119, 120 are fixed onto the lower substrate 103 by processes such as adhesion.

Moreover, it is also possible to integrally form the piezoelectric vibrators 119, 120 with the lower substrate 103 by processes such as sol-gel or sputtering.

As described above, for the variable-profile mirror of the fourth embodiment, since the semiconductor manufacturing technique and derived MEMS technique can be applied in most of the manufacturing steps, the mirror is preferable particularly for miniaturization and mass production at a low cost.

Furthermore, in the variable-profile mirror according to the fourth embodiment, the valve-less diffuser pump (diaphragm pump) is disposed as a basic constitution in the lower part of the pressure chamber right under the variable-profile mirror, thereby suction/exhaust is performed, and the variable-profile mirror is deformed to an appropriate profile. A desired focus distance is obtained, and the mirror of the electrostatic driving type is combined, so that the aberration is corrected.

Additionally, the operation principle of the diaphragm pump, that is, the valve-less diffuser pump is described in detail, for example, in J. Microeng. 9 (1999) 34–44, "A numerical design study of the valve-less diffuser pump using a lumped-mass model".

As described above, in the fourth embodiment, the micro pump such as the valve-less diffuser pump in which a relatively large power amount is obtained can be realized with a very simple constitution of the laminated three substrates.

Moreover, even with the micro pump such as the valve-less diffuser pump, there are no complicated functions such as valves, and the substrate can collectively be processed by the semiconductor manufacturing process. Therefore, when photolithography is applied, a very small-sized device can be realized.

Particularly, the sectional area vertical to the optical axis of the variable-profile mirror is minimized by this laminated structure.

For the action of the variable-profile mirror of the fourth embodiment, since the vibration amplitude of the diaphragm of the pump for suction and the vibration frequency of the diaphragm of the pump for exhaust are controlled, the pressure in the pressure chamber is set to be positive or negative, the elastic portion is thereby deformed, and the desired focus distance is obtained.

In this case, examples of a preferable control method include a method of stopping the pump for suction or exhaust and adjusting the pressure of the pressure chamber, so that further energy saving can be achieved.

Furthermore, the voltage is appropriately applied to the divided electrodes of the electrostatically driven mirror, so that the aberration is corrected.

According to the fourth embodiment, the following characteristic effect is produced, as compared with the other embodiments described later.

That is, according to the fourth embodiment, the aberration is corrected, and additionally a large deformed amount in the mirror can be obtained (pressurizing/pressure reduction can be achieved).

(Fifth Embodiment)

A fifth embodiment of the present invention will be described with reference to FIGS. 16A and 16B.

FIGS. 16A and 16B are an upper surface perspective view showing the structure of the intermediate substrate 102 of the variable-profile mirror shown as the variable-profile optical device according to the fifth embodiment of the present invention in FIG. 8, and a sectional view taken along 16B—16B of FIG. 16A.

Additionally, it is assumed that the constitution of each part not described here is similar to that of the fourth embodiment.

In the variable-profile mirror of the electrostatic type according to the fourth embodiment, the electrode 109 as the lower electrode is divided into four in a vertical direction in FIG. 10A. However, to obtain a higher-precision image, it is preferable that the electrostatic driven mirror can freely be deformed into optional curved surfaces.

To solve the problem, in the fifth embodiment shown in FIGS. 16A and 16B, the electrode 109 formed as the lower electrode of the aluminum thin film is divided in a matrix form, and an adequate voltage is applied to a multiplicity of divided electrodes 109. As compared with the first embodiment shown in FIG. 10A, a freedom degree in deformation is increased. As a result, it is possible to highly correct the aberration.

Moreover, the multiplicity of divided electrodes 109 extend to the electrode pads 110 for the connection to the external leads.

That is, as seen from FIG. 16A, the electrode 109 is divided in the matrix form, and a plurality of electrode pads 110 are formed for the respective electrodes 109 divided in the matrix form.

Additionally, the connection of the multiplicity of electrodes 109 divided in the matrix form to the corresponding pads 110 formed in the matrix form is not particularly shown.

Moreover, the connection can easily be realized, when a multilayered wiring technique for use in a usual semiconductor integrated circuit (e.g., S. M. Sze, VLST Technology second edition, pp. 414, ISBN 0-07-100347-9) is applied.

Furthermore, the variable-profile mirror according to the fifth embodiment has a basic constitution in which the electrode on the side of the electrostatically driven mirror is divided in the matrix.

The action and control method of the variable-profile mirror according to the fifth embodiment are the same as those of the fourth embodiment.

The fifth embodiment produces a characteristic effect that a higher-precision aberration correction can be achieved.

(Sixth Embodiment)

A sixth embodiment of the present invention will be described with reference to FIG. 17.

Figure 17:
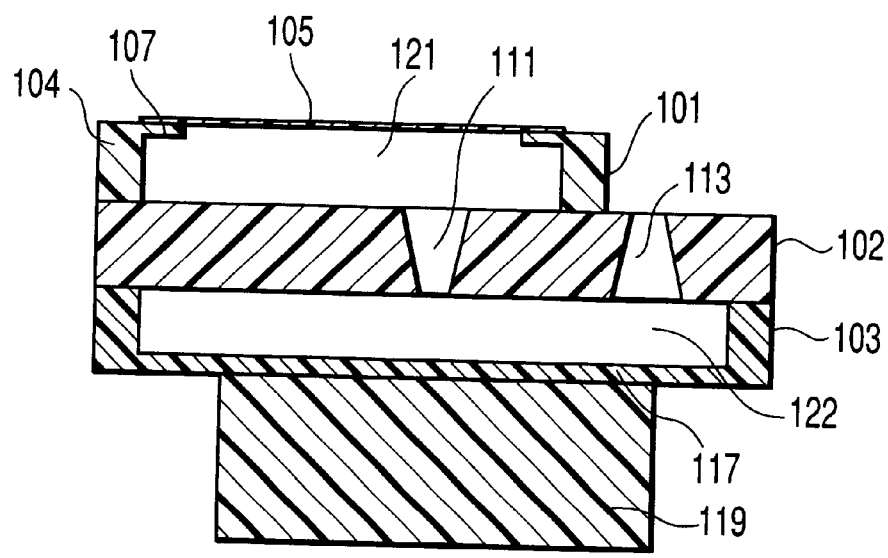
FIG. 17 is a sectional view corresponding to FIG. 13 as a 13—13 sectional view of FIG. 12 in the fourth embodiment, showing the variable-profile optical device only by a single pump according to a sixth embodiment of the present invention.

FIG. 17 is a sectional view corresponding to FIG. 13 as a 13—13 sectional view of FIG. 12 in the fourth embodiment, showing the variable-profile optical device only by a single pump according to the sixth embodiment of the present invention.

Additionally, the constitution of each part not described here is assumed to be similar to that of the fourth embodiment.

In the sixth embodiment, when the diaphragm pump 122 constituting the single pump operates by the driving of the piezoelectric vibrator 119 in FIG. 17, the flow rate is generated toward the opening for suction 111 as the inner nozzle from the opening for atmospheric suction 113 as the outer nozzle, the pressure of the pressure chamber 122 increases, and the flexible thin film 105 as the thin film mirror is deformed into a convex profile.

Subsequently, when the piezoelectric vibrator 119 stops, the flexible thin film as the thin film mirror is flatted by the film tension of the flexible thin film 105 as the thin film mirror.

Therefore, when the driving voltage of the piezoelectric vibrator 119 is adjusted, the flexible thin film 105 as the thin film mirror can continuously be deformed to a convex surface from a flat surface.

Moreover, if the shapes of the opening for atmospheric suction 113 as the outer nozzle and the opening for suction 111 as the inner nozzle are reversed, the variable-profile mirror can be realized such that the flexible thin film 105 as the thin film mirror is continuously deformed into a concave surface from a flat surface.

In the sixth embodiment, as compared with the fourth embodiment (FIG. 8) including two diaphragm pumps, the flexible thin film 105 as the thin film mirror can be deformed only in a convex or concave surface, but miniaturization is achieved.

Moreover, the variable-profile mirror according to the sixth embodiment has the basic constitution in which the single pump only for suction or exhaust pressurizes the pressure chamber (only with the positive or negative pressure).

According to the sixth embodiment, the flexible thin film as the thin film mirror can be deformed only in a convex or concave surface, but there are produced characteristic effects that the structure is simple and further miniaturization can be expected as compared with the fourth embodiment.

(Seventh Embodiment)

A seventh embodiment of the present invention will be described with reference to FIGS. 18 to 22B.

Additionally, the constitution of each part not described here is assumed to be similar to that of the fourth embodiment.

Figure 18:
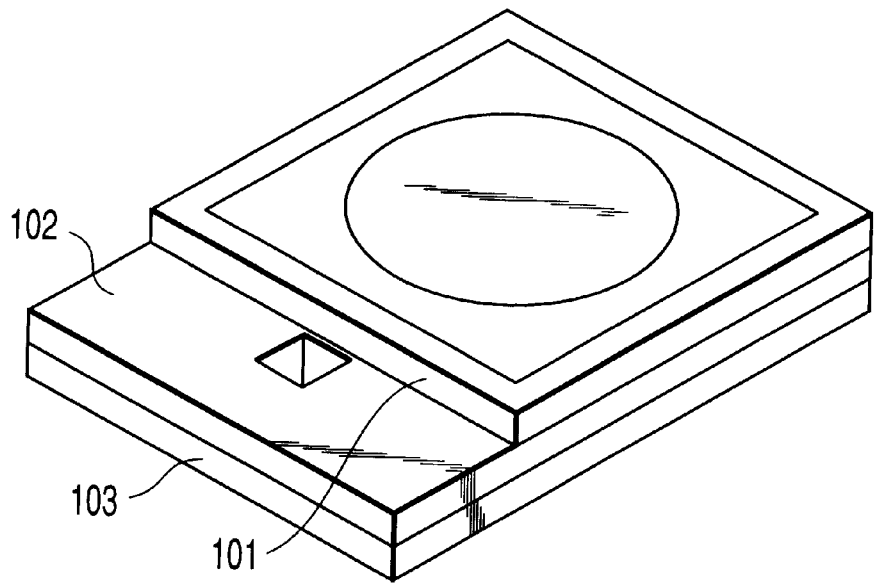
FIG. 18 is an upper surface perspective view showing the whole constitution of the variable-profile mirror formed only of a left half of the variable-profile mirror of FIG. 8 in the fourth embodiment, showing the variable-profile optical device only by a single pump and single mirror according to a seventh embodiment of the present invention.

FIG. 18 is an upper surface perspective view showing the total constitution of the variable-profile mirror formed only of a left half of the variable-profile mirror of FIG. 8 in the fourth embodiment, showing the variable-profile optical device only by a single pump and single mirror according to the seventh embodiment of the present invention.

The variable-profile mirror as the variable-profile optical device according to the seventh embodiment has a three-layer structure; an upper substrate 101, intermediate substrate 102, and lower substrate 103, and the bonding portions between the respective substrates have an air-tight structure.

Figure 19A:
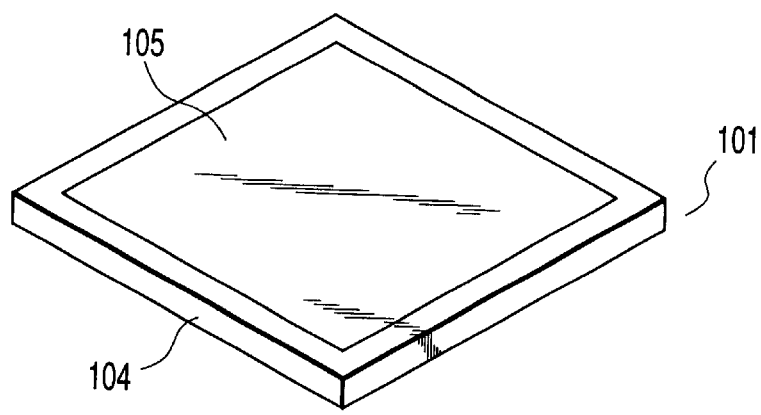
FIGS. 19A, 19B and 19C are an upper surface perspective view, a rear surface perspective view and a sectional view showing the structure of the upper substrate 101 of FIG. 18.
Figure 19B:
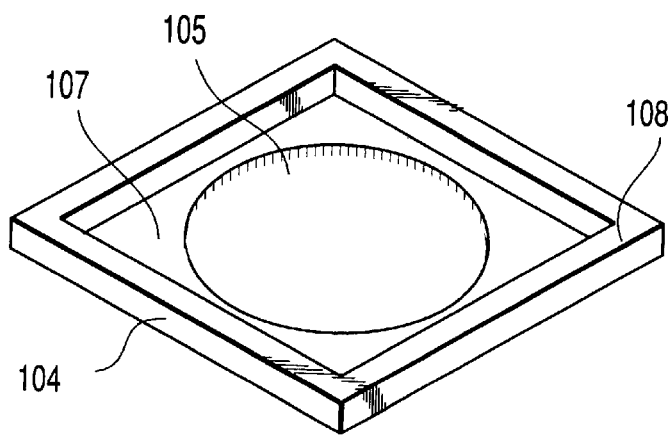
Figure 19C:
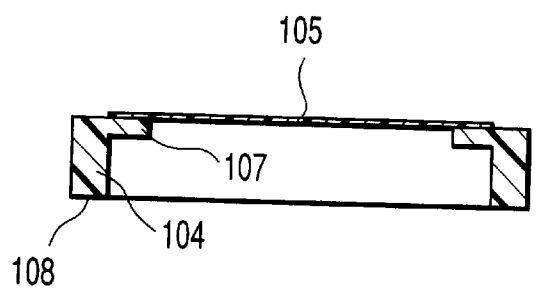

FIGS. 19A, 19B and 19C are an upper surface perspective view, rear surface perspective view and sectional view showing the structure of the upper substrate 101 of FIG. 18.

First, as shown in FIGS. 19A and 19B, only one opening is formed in the frame member 104 formed of the single-crystal silicon having a thickness of 300 $\mu$m and constituting the upper substrate 101.

In the opening, as shown in FIGS. 19A, 19B and 19C, the single flexible thin film 105 is formed of two layer films; a polyimide thin film having a thickness of 1 $\mu$m, and an aluminum thin film having a thickness of 50 nm.

Here, the opening of the frame member 104 has a rectangular shape, the thin portion 107 of single-crystal silicon having a thickness of 20 $\mu$m extends from the opening, and a substantially circular opening is formed.

Additionally, here, the surface 108 of the frame member 104 in the rear surface perspective view shown in FIG. 19B forms the bonding surface to the intermediate substrate 102.

Moreover, the flexible thin film 105 functions as a mirror having an aluminum thin film as the reflective surface.

Figure 20A:
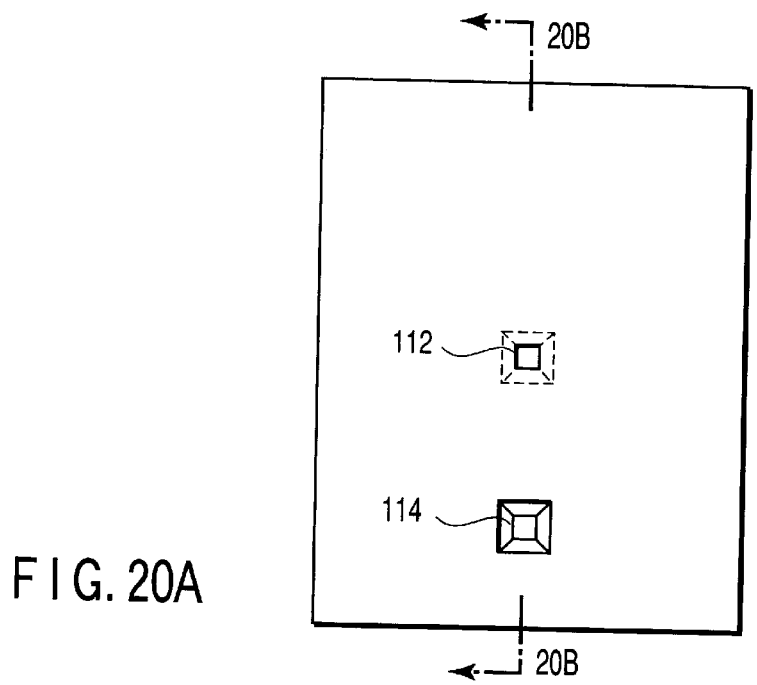
FIGS. 20A and 20B are an upper surface view showing the structure of the intermediate substrate 102 of FIG. 18 and a 20B—20B sectional view of FIG. 20A.
Figure 20B:
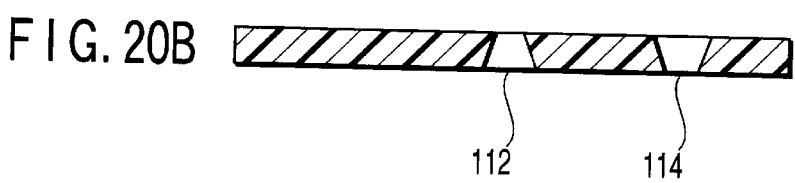

FIGS. 20A and 20B are an upper surface view showing the structure of the intermediate substrate 102 of FIG. 18 and a 20B—20B sectional view of FIG. 20A.

In the intermediate substrate 102, the opening for exhaust 112 is formed in the region disposed opposite to the circular opening defined by the thin portion 107 in the region corresponding to the single flexible thin film 105 of FIGS. 19A, 19B and 19C, and the opening for atmospheric exhaust 114 is formed outside the region to which the upper substrate 101 is bonded.

Moreover, as seen from the sectional view shown in FIG. 20B, the opening for atmospheric exhaust 114 is formed in such a manner that the opening area on the upper substrate 101 side is larger than that on the lower substrate 103 side.

Furthermore, the opening for exhaust 112 is formed in such a manner that the opening area on the upper substrate 101 side is larger than that on the lower substrate 103 side.

Figure 21A:
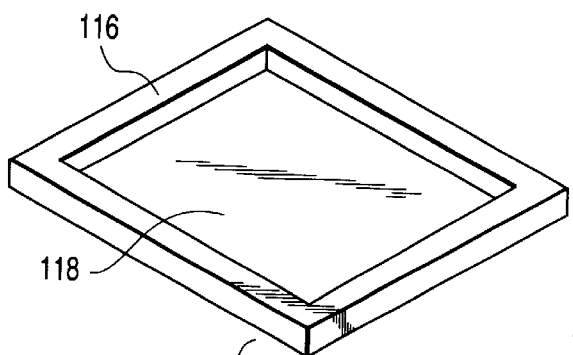
FIGS. 21A and 21B are an upper surface perspective view and a rear surface perspective view showing the structure of the lower substrate 103 of FIG. 18.
Figure 21B:
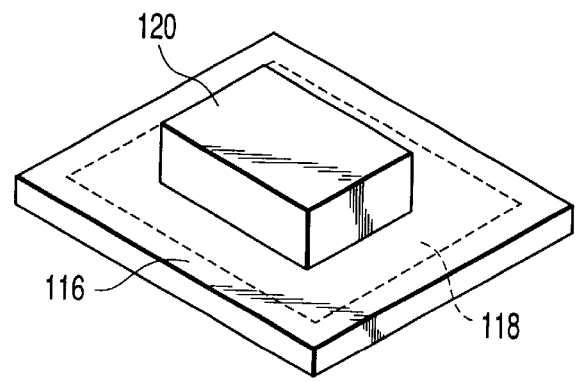

FIGS. 21A and 21B are an upper surface perspective view and rear surface perspective view showing the structure of the lower substrate 103 of FIG. 18.

The lower substrate 103 includes only the chamber for exhaust 118 which is partitioned by the frame member 116 formed of single-crystal silicon having a thickness of 300 $\mu$m and which is formed of single-crystal silicon having a thickness of 40 $\mu$m.

Here, the surface of the frame member 116 in the upper surface perspective view shown in FIG. 21A serves as the bonding surface to the intermediate substrate 102.

Moreover, in the rear surface perspective view shown in FIG. 21B, the piezoelectric vibrator 120 is formed on the chamber for exhaust 118 disposed opposite the intermediate substrate 102.

The operation of the variable-profile optical device in the seventh embodiment will next be described.

Figure 22A:
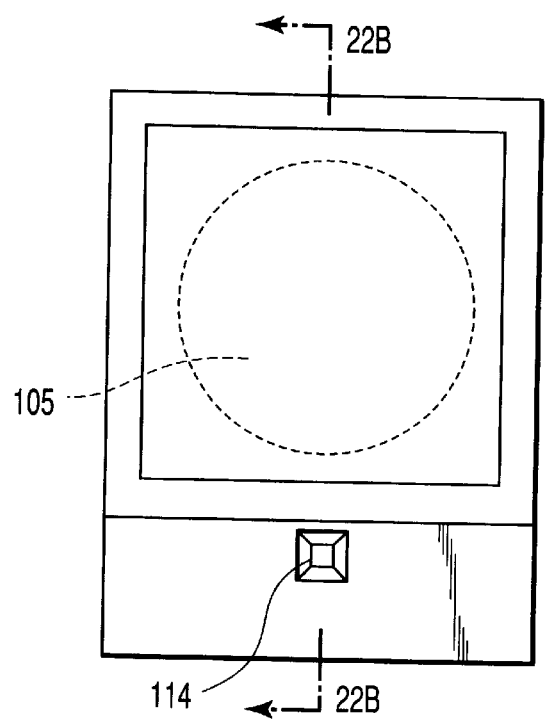
FIGS. 22A and 22B are an upper surface view of the constitution shown in FIG. 18 and a 22B—22B sectional view of FIG. 22A.
Figure 22B:
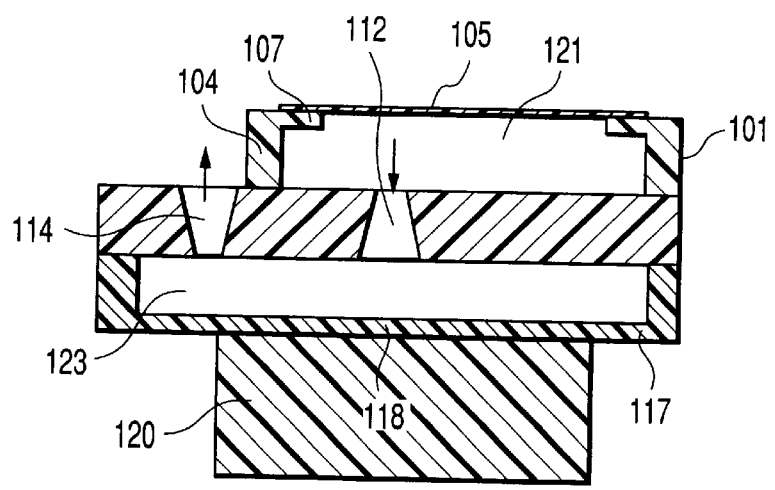

FIGS. 22A, 22B are an upper surface view of the constitution shown in FIG. 18 and a 22B—22B sectional view of FIG. 22A.

First, the operation of the flexible thin film 105 will be described with reference to FIG. 22B.

The flexible thin film 105 constitutes a part of the pressure chamber 121 which has the frame member 104 surrounding the thin film as the side surface, and the intermediate substrate 102 as the bottom surface.

Moreover, the chamber for exhaust 118 and piezoelectric vibrator 120 constitute the single diaphragm pump 123.

Additionally, the piezoelectric vibrator 120 is connected to the lead wire, and can therefore be driven by a driving pulse from the outside (not shown).

Here, when the piezoelectric vibrator 120 is vibrated, the flow rate is generated toward the outside air (the outside of the opening for atmospheric exhaust 114) from the pressure chamber 121 via the opening for exhaust 112 and the single diaphragm pump 123.

Here, since the circular opening defined by the thin portion 107 of the flexible thin film 105 has a remarkably low rigidity as compared with the other portions of the pressure chamber 121, the pressure of the pressure chamber 121 decreases with respect to the outside air, and the opening is deformed in the concave surface and functions as a circular variable-profile mirror.

In this case, the pressure of the pressure chamber 121 can easily be controlled by the driving pulse for driving the piezoelectric vibrator 120. Moreover, since only the intermediate substrate 102 is interposed between the pressure chamber 121 and the single diaphragm pump 123, response is very high, and the profile of the variable-profile mirror can smoothly be controlled.

Additionally, in the constitution, different from the technique of using a fluid reservoir to constitute a closed space, the influence of fluctuation of atmospheric pressure is not exerted.

Moreover, considering the efficiency, the driving frequency of the piezoelectric vibrator 120 is preferably set to the vicinity of the resonance frequency of the diaphragm 118. Here, the driving frequency is set to be sufficiently larger than the resonance frequency of the flexible thin film 105. Thereby, the flexible thin film 105 is prevented from being vibrated by the driving of the diaphragm pump 123 and a stable image forming capability is obtained.

In the seventh embodiment, the basic constitution is minimized only by the single mirror and single pump.

Moreover, for the action of the seventh embodiment, the flexible thin film 105 as the single mirror is deformed/controlled by the pressure given by the single pump.

Furthermore, in the seventh embodiment, the flexible thin film can be deformed/controlled only in the concave or convex surface, and the aberration cannot be corrected. However, the seventh embodiment is the simplest of the fourth to sixth embodiments.

Additionally, in the fourth to sixth embodiments, for the second flexible thin film (electrostatically driven variable-profile mirror) 106, as long as the aberration of the first flexible thin film (pressure driven variable-profile mirror) 105 can be allowed, needless to say, the second flexible thin film (electrostatically driven variable-profile mirror) 106 is unnecessary.

This can be realized when the second flexible thin film 106 is simply omitted from the fourth to sixth embodiments.

Therefore, as described above, according to the fourth to seventh embodiments of the present invention, there can be provided a low-cost variable-profile mirror and variable-profile optical element which has high response and which can obtain sufficient displacement with a small size.

Moreover, as described above, according to the fourth to seventh embodiments of the present invention, in the large-displacement variable-profile optical device using the fluid pressure, there can also be provided the composite variable-profile optical element in which aberration correction can also be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical element comprising:
    a variable-profile optical device in which a pressure is applied to an elastic portion, a profile of said elastic portion is thereby changed and a focus distance may be varied;
    a structural member which is bonded to a portion of said variable-profile optical device, and which supports said variable-profile optical device;
    a pressure chamber bonded to said elastic portion of said variable-profile optical device, so that the pressure is applied to said elastic portion of said variable-profile optical device;
    a pump device including a chamber, a diaphragm which also serves as a portion of a wall of the chamber, and nozzles for suction and discharge which are connected to said chamber; and
    a vibration device which vibrates the diaphragm of said pump device,
    wherein said pump device is connected to said pressure chamber and the outside of said structural member, at least a portion of said pressure chamber and a portion of the chamber of said pump device are disposed in the same structural member, and a vibration frequency or amplitude of said vibration device is controlled, to vary a focus distance of said variable-profile optical device.

2. The optical element according to claim 1, further comprising: a mark for optical axis adjustment in a visible portion of said structural member.

3. The optical element according to claim 1, wherein said variable-profile optical device has light transmission properties, the first surface has rigidity, and the second surface disposed opposite said first surface has an elasticity lower than that of the first surface, and said second surface constitutes a variable-profile lens as the elastic portion to which the pressure is to be applied.

4. The optical element according to claim 1, wherein said variable-profile optical device comprises a flexible thin film having at least a reflective surface in the first surface, and a second surface of said flexible thin film constitutes a variable-profile mirror as the elastic portion to which said pressure is to be applied.

5. The optical element according to claim 1, further comprising: a plurality of said pump device; and a plurality of the vibration device, wherein at least one of said pump device is connected in such a manner that said pressure chamber is pressurized, and at least one of the other pump device is connected in such a manner that the pressure of said pressure chamber is reduced, and respective chambers of said plurality of the pump device are arranged via a line crossing at right angles to an optical axis of said variable-profile optical device.

6. The optical element according to claim 5, which stops the vibration device of said pump device for pressurizing or the vibration device of the pump device for pressure reduction, and controls the pressure in said pressure chamber to a desired value.

7. The optical element according to claim 2, wherein said variable-profile optical device has light transmission properties, the first surface has rigidity, and the second surface disposed opposite said first surface has an elasticity lower than hat of the first surface, and said second surface constitutes a variable-profile lens as the elastic portion to which the pressure is to be applied.

8. The optical element according to claim 2, wherein said variable-profile optical device comprises a flexible thin film having at least a reflective surface in the first surface, and a second surface of said flexible thin film constitutes a variable-profile mirror as the elastic portion to which said pressure is to be applied.

9. The optical element according to claim 2, further comprising: a plurality of said pump device; and a plurality of the vibration device, wherein at least one of said pump device is connected in such a manner that said pressure chamber is pressurized, and at lea t one of the other pump device is connected in such a manner that the pressure of said pressure chamber is reduced, and respective chambers of said plurality of the pump device are arranged via a line crossing at right angles to an optical axis of said variable-profile optical device.

* * * * *